US009596695B2

(12) United States Patent
Dimou et al.

(10) Patent No.: US 9,596,695 B2
(45) Date of Patent: Mar. 14, 2017

(54) METHODS AND DEVICES FOR REDUCING INTERFERENCE IN HETEROGENEOUS COMMUNICATION NETWORKS BASED ON INTER-CELL INTERFERENCE COORDINATION

(71) Applicant: Telefonaktiebolaget L M Ericsson (publ), Stockholm (SE)

(72) Inventors: Konstantinos Dimou, Stockholm (SE); Asif Ali Khan, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/731,147

(22) Filed: Jun. 4, 2015

(65) Prior Publication Data
US 2015/0312918 A1    Oct. 29, 2015

Related U.S. Application Data

(62) Division of application No. 13/731,804, filed on Dec. 31, 2012, now Pat. No. 9,066,357.

(51) Int. Cl.
*H04W 72/08* (2009.01)
*H04B 1/38* (2015.01)
(Continued)

(52) U.S. Cl.
CPC ............ *H04W 72/082* (2013.01); *H04B 1/38* (2013.01); *H04L 5/0037* (2013.01);
(Continued)

(58) Field of Classification Search
CPC ............. H04W 72/0406; H04W 16/14; H04W 72/082; H04W 72/0453; H04W 72/04;
(Continued)

(56) References Cited

U.S. PATENT DOCUMENTS 8,934,912 B2    1/2015  Lee et al.
2007/0097939 A1    5/2007  Nylander et al.
(Continued)

FOREIGN PATENT DOCUMENTS

EP         2343943 A1     7/2011
GB         2390953 A      1/2004
WO      2012/041393 A1    4/2012

OTHER PUBLICATIONS

Interdigital Communications, LLC: "eICIC Macro-Femto: Time-Domain Muting and ABS," R1-105951, 3rd Generation Partnership Project (3GPP) TSG-RAN, vol. RAN WG1, No. 63, Jacksonville, FL, USA; Nov. 15-19, 2010, 3 pages.
(Continued)

*Primary Examiner* — Magdi Elhag
(74) *Attorney, Agent, or Firm* — Rothwell, Figg, Ernst & Manbeck, P.C.

(57) ABSTRACT

Devices and methods for reducing interference in a communication network including a first node and a first node coverage area, a second closed subscriber group (CSG) node located within the first node coverage area, and one or more user equipment (UE) devices located within the first node coverage area are provided. In one embodiment, a method includes receiving link quality measurement information from the one or more UE devices and determining if a link quality value for a UE device is below a predetermined link quality threshold value and is caused by the second CSG node. If both conditions are true, if the UE device is a member of the second CSG node, and if the first UE device does not include interference cancellation capability, the method further includes instructing the second CSG node to mute transmission causing interference for the UE device.

22 Claims, 12 Drawing Sheets

(51) Int. Cl.
   *H04L 5/00* (2006.01)
   *H04W 72/04* (2009.01)
   *H04W 36/30* (2009.01)
   *H04W 16/16* (2009.01)

(52) U.S. Cl.
   CPC ........ *H04W 72/0406* (2013.01); *H04W 16/16* (2013.01); *H04W 36/30* (2013.01)

(58) Field of Classification Search
   CPC ... H04W 72/085; H04W 24/02; H04W 72/08; H04W 16/32; H04W 28/20; H04L 5/0073
   USPC .......... 455/448–451, 452.1, 452.2, 454, 500, 455/501, 230, 231; 370/329
   See application file for complete search history.

(56) References Cited

U.S. PATENT DOCUMENTS

| | | |
|---|---|---|
| 2009/0268684 A1 | 10/2009 | Lott et al. |
| 2009/0323663 A1 | 12/2009 | Nakatsugawa |
| 2010/0197338 A1 | 8/2010 | Bonneville et al. |
| 2011/0092234 A1 | 4/2011 | Kim et al. |
| 2011/0116480 A1 | 5/2011 | Li et al. |
| 2011/0151790 A1* | 6/2011 | Khandekar ........... H04L 5/0062 455/63.1 |
| 2011/0294514 A1 | 12/2011 | Kulkarni |
| 2012/0002637 A1 | 1/2012 | Adjakple et al. |
| 2012/0120846 A1* | 5/2012 | Hwang ................. H04W 24/10 370/254 |
| 2013/0142062 A1 | 6/2013 | Dinan |
| 2013/0142138 A1 | 6/2013 | Dinan |
| 2013/0142288 A1 | 6/2013 | Dinan |
| 2013/0142291 A1 | 6/2013 | Dinan |
| 2013/0170376 A1 | 7/2013 | Dinan |
| 2013/0170396 A1 | 7/2013 | Dinan |
| 2013/0322350 A1 | 12/2013 | Gaur et al. |

OTHER PUBLICATIONS

International Search Report, International Application No. PCT/IB2013/061116, Date of Mailing: Apr. 23, 2014, Applicant: Telefonaktiebolaget L M Ericsson (PUBL), International Filing Date: Dec. 18, 2013, 12 pages.

* cited by examiner

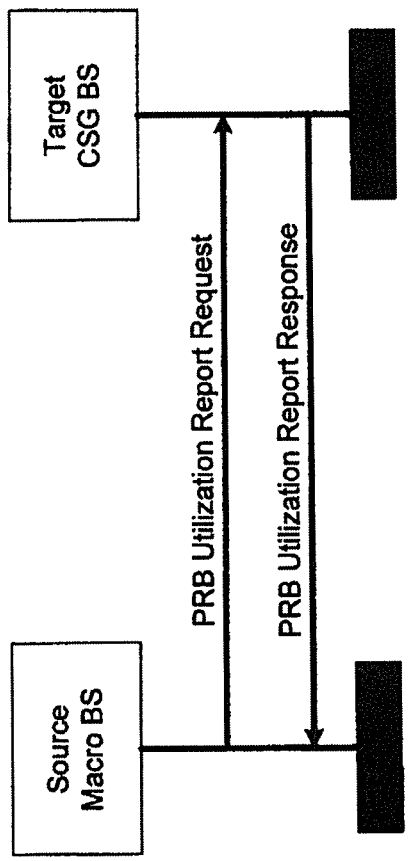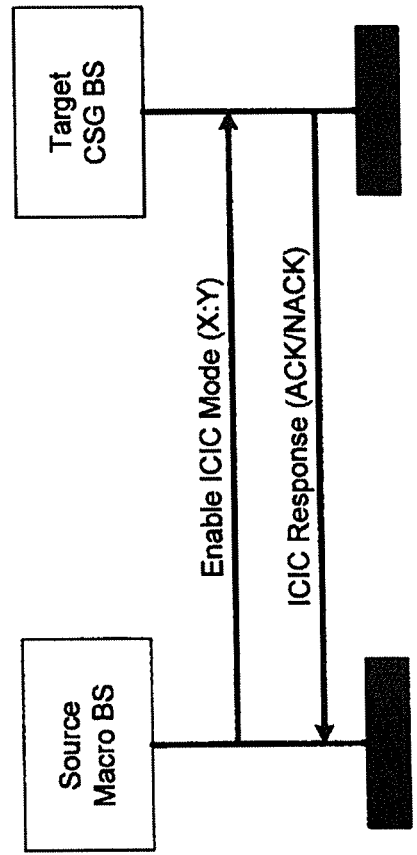

METHODS AND DEVICES FOR REDUCING INTERFERENCE IN HETEROGENEOUS COMMUNICATION NETWORKS BASED ON INTER-CELL INTERFERENCE COORDINATION

CROSS-REFERENCE TO RELATED APPLICATION(S)

This application is a divisional of U.S. application Ser. No. 13/731,804, filed Dec. 31, 2012. The disclosure of the above-referenced application is incorporated herein in its entirety by reference.

TECHNICAL FIELD

The present invention relates generally to improving data transmission in communication networks, and more particularly, to methods and devices for reducing interference in heterogeneous communication networks based on inter-cell interference coordination.

BACKGROUND

Currently, the deployment of heterogeneous networks (HetNets) is viewed as one of the most cost efficient deployment strategies for wireless communication systems in addressing the growing traffic demands and the expectation for higher data rates. Typical cellular networks today are characterized by non-uniform user and traffic distributions. HetNets complement the macro networks with low power nodes (LPNs) of a diverse nature, such as micro, pico, and femto base stations or relay nodes, which can achieve significantly improved capacity and high data rates. The resulting fragmented multi-layer architecture HetNet is illustrated in FIG. 1A, showing a macro cell 104 as part of a communication network 102, with a first node, or base station 106, and with second node LPNs, or base stations, 108-112.

In heterogeneous networks, there are various types of base stations, each of which can be associated with differing cell sizes. For instance, large base stations, such as macro cell base stations 106, are typically installed on masts, rooftops and other existing structures. Macro cell base stations 106 normally have power outputs on the order of tens of watts and, thus, provide large cell coverage. Small base stations, such as micro, pico and femto cell base stations 108-112 are LPNs, which are commonly designed for residential or small business environments. The power outputs for these small base stations 108-112 are normally less than a watt to a few watts, which results in a small cell coverage range.

HetNets are less susceptible to the strains on signal power (due to the increase in distance from the transmitting point) and are well known to defy the inverse square law of distance by moving the Base Station (BS) closer to users and providing similar Quality-of-Service (QoS) throughout the cell area. Thus, HetNet deployments possess an inherent capability to address the limitations implied by channel capacity and to provide a uniform user experience throughout the cell area, irrespective of user location. The potential of HetNets to bring gains in coverage and capacity are accomplished because:

Moving the BS closer to users results in better radio link conditions, which in turn leads to higher data rates for users connected to the low power nodes 108-112.

LPN cells 114-118 provide access to the users previously handled by the macro layer, thus reducing the load from the macro cell 104 (called "macro offloading"). This results in higher availability of resources and thus higher data rates for the users connected to macro base stations 106.

HetNet deployments generally tend to provide uniform data rates within a given area 104.

Within 3GPP Long Term Evolution Advanced (LTE-A), three types of LPNs are specified within the 3GPP TR 36.814 specification standard according to their respective access rights. Open Access (OA) LPNs provide that any User Equipment (UE) 120, 122, 124, and 132 can associate with the Open Access LPN if the LPN cell is the one providing the best signal quality to the UE. As used herein, the terms LPN and LPN cell represent any type of small range, or low power, cell—e.g., micro, pico or femto cells 114-118. The terms LPN, micro, pico and femto cells are used interchangeably herein. Closed Subscriber Group (CSG) LPNs 108-112 provide additional privacy to the user as control is granted to the end user by letting the cell owner authorize access to the LPN 108-112 and configure the set of UEs 120, 122, 124, and 132 to be provided service by the LPN 108-112, called authorized UEs. Thus, the cell owner selects a set of UEs and configures the CSG LPN to limit access only to them. Hybrid Access (HA) LPNs are a composite of OA and CSG modes; which by default operate in CSG mode while switching into OA mode at certain instances, thus providing service to certain non-authorized UEs temporarily, e.g., visitors within a given home, etc.

The access nature of the LPNs 108-112 has different implications on system performance based on the tradeoff between interference and increased capacity. The incorporation of LPNs 108-112 within the macro cell 104 can cause interference to the macro UEs 126-130 that are in close proximity to the LPNs 108-112 but are associated with the macro cell 104. OA tends to provide higher gains in system capacity and increase UE throughput, while causing less interference to the nearby UEs. However, the presence of CSG-type LPNs 108-112 within the macro cell 104 have a tendency to accentuate the interference scenarios and to enhance the cell edge effect in the macro cell area. As the CSG cells 114-118 provide access only to a limited number of UEs 120, 122, 124, and 132, the nearby macro UEs 126-130 experience severe interference from the CSG cells 114-118. In particular, the presence of CSG cells 114-118 causes significant interference problems for the macro UEs 126-130 and results in very low Signal to Interference-plus-Noise Ratio (SINR), UE throughput, and a reduced system capacity.

The presence of CSG cells 114-118 intensifies the serving conditions in the macro cell area 104 and, as a result, more UEs experience service outages. The prime reason for the cause of degraded system performance for the CSG scenarios is the interference resulting due to limited service provisioning constraints of the CSG cells 114-118. As the CSG cells 114-118 only provide access to a limited number of UEs (called authorized UEs) 120, 120, 124, and 132, the unauthorized macro UEs 126-130 undergo severe interference from the CSG transmission, which results in reduced performance, but cannot access the CSG cell 114-118 despite the relative proximity of the CSG base station 108-112. By contrast, in OA scenarios, if a UE is operating close enough to an OA base station to experience significant interference from the OA base station, the UE will typically be able to access the corresponding OA cell and use the OA base station as its serving base station.

FIG. 1B illustrates major interference scenarios that can be observed in a HetNet deployment. For example, the downlink transmission signals 138 and 148 from the CSG LPNs 112 and 110 to the macro UE 130 causes interference between the macro UE 130 and its macro BS 106. Further, with respect to the uplink (UL) transmission signals, macro UEs associated with the macro cell, when located close to a CSG cell, cause high UL interference for the UEs connected to the CSG cell and transmitting in the UL.

CSG cells 114-118 have high tendencies to impact the performance of nearby UEs 126-130 that are connected to the macro cell 104. A major source of interference in HetNet deployments featuring CSG cells is the transmission of Cell-specific Reference Signals (CRS) from the CSG cells. FIG. 2 illustrates the exemplary downlink SINR of macro UEs for different UE types. The Reference Case refers to a macro only scenario without any CSG LPN cells in the macro cell area 104, and the CSG Case refers to the situation where there are, for example, ten CSG LPNs in the macro cell. Further, for example, 20% of the UEs in the macro cell are connected to the CSG cells. Under this scenario, as shown in FIG. 2, if the UEs are not capable of cancelling interference resulting from the CRS signals, the average SINR of the macro UEs is observed to suffer significant reduction. For example, as shown in column 204, the SINR for the macro UEs that lack CRS interference cancellation (IC) capability is 0.39 dB. In contrast, if the macro UEs are capable of cancelling CRS signal interference, the CSG cells tend to improve the SINR of the UEs by offloading the macro cell, as shown in column 206 with the SINR of 6.4 dB. This indicates that a major part of interference in CSG-featured HetNet deployments is caused due to the transmission of CRS signals from the CSG BSs. Since these CSG cells provide service to a limited number of UEs, the Physical Resource Block (PRB) utilization in these cells is very small (e.g., typically less than 10%, even for a heavily loaded traffic scenario), and thus the transmission on the Physical Downlink Shared Channel (PDSCH) is less frequent. Hence, the interference is mainly caused by the CRS signals which are transmitted (in each sub-frame) by all BS in the downlink (DL).

Since the CRS interference cancellation is a relatively new concept to be introduced in UEs of Rel-11, the UEs of previous releases lack this functionality. Thus, for HetNet deployments featuring CSG cells, there is a need to devise and implement efficient Inter-Cell Interference Coordination (ICIC) techniques to limit the negative performance impact on macro UEs under the influence of interference from the CSG cells.

The current techniques aiming to overcome the problem of interference due to the transmission of neighboring cells' CRS can be characterized into Network Assisted (NA) or UE-Implemented (UE-I) solutions. In the NA solutions, static or semi-static (pre-settled policy, triggered by an event) procedures are implemented among the BSs to perform ICIC. In contrast, the UE-Implemented procedures mainly advocate the cancellation of interference due to CRS at the UE.

One NA technique is Enhanced Inter-Cell Interference Coordination (e-ICIC) using Almost Blank Sub-frames (ABS). The ABS technique controls the macro cell, the LPNs, or both to limit the muting of transmissions at distinct intervals to avoid interference. The macro cells mute their transmissions in alternate sub-frames to protect the UEs associated with the pico cells from the interference caused by the macro. However, to perform channel measurements and to maintain compatibility among the UEs of different releases, CRS signals are transmitted in all sub-frames (including the muted sub-frames). This technique may be useful for deployments featuring OA cells, where the interference experienced by the UEs is dominated by the transmissions on the Physical Downlink Shared Channel (PDSCH). However, for the circumstances where CSG cells are deployed in the system, muting of the macro cell or the CSG cells is not an acceptable solution since most of the traffic (such as more than 95%) in such a scenario is being served by the macro cell (i.e. high macro PRB utilization). This means that muting transmissions of the macro BS is not desirable because it will result in excessive scheduling delays and lead to congestion in the macro cell. Further, muting transmissions of the CSG cells does not reduce the DL interference to macro UEs, since the interference is mainly caused by the transmission of CRS, and in the ABS technique, CRS are transmitted in all sub-frames (even in the muted ones).

A UE-Implemented technique is known as Cell-specific Reference Signals -Interference Cancellation (CRS-IC). CRS-IC is an Interference Cancellation (IC) mechanism implemented in the UE with the goal of minimizing the interference from CRS with use of appropriate signal processing. As the CRSs are transmitted on pre-determined intervals with a well determined format, the UEs can reliably estimate, or obtain these signals from neighbor cells, and thus can perform the interference cancellation without the need for any strict coordination mechanisms between cells. However, implementing CRS-IC within UEs in general is a complicated task which increases the device cost and results in increased UE energy consumption. Furthermore, removing the interfering signals from each transmission takes away part of the useful signal, resulting in low SINR. Moreover, cancellation of interference from the CRS under CRS-IC is problematic due to estimation errors. Further, since CRS-IC is a relatively new concept to be introduced in UEs of Rel-11, the UEs of previous releases lack this functionality.

Accordingly, there is a need to reduce interference in UEs that may be caused by data and/or reference signals from, for example, UE devices connected to a neighbor cell in a HetNet deployment featuring CSG cells.

SUMMARY

Particular embodiments are directed to devices and methods for reducing interference in heterogeneous communication networks based on inter-cell interference coordination.

In one particular embodiment, a method is provided for reducing interference in a communication network including a first node and a first node coverage area, a second closed subscriber group (CSG) node, transmitting on a bandwidth at a lower power than the first node and located within the first node coverage area, and one or more user equipment (UE) devices located within the first node coverage area. The method includes receiving link quality measurement (LQM) information from the one or more UE devices and determining, based on the received link quality measurement information, if a link quality value for a first UE device of the one or more UE devices is below a predetermined link quality threshold value. If the link quality value is below the predetermined link quality threshold value, the method further includes determining, based on the received link quality measurement information, if the link quality value degradation is caused by the second CSG node. If the link quality value degradation is caused by the second CSG node, the method further includes determining if the first UE device is a member of the second CSG node and, if not a member, the method further includes determining if the first UE device includes an interference cancellation (IC) capability and, if the first UE device does not include an IC capability, the method further includes instructing the second CSG node to operate in an IC mode that mutes transmission of the second CSG node on a part of the bandwidth causing interference for the first UE device. The method further includes, if the first UE device does not include an IC capability, initiating a handshake between the first node and the second CSG node to identify a part of bandwidth for muting transmission and instructing the second CSG node to operate in an IC mode that mutes transmission of data and/or reference signals causing interference for the first UE device on the identified part of the bandwidth.

According to particular embodiments, the method further includes, after determining if the first UE device includes an interference cancellation (IC) capability and prior to instructing the second CSG node to operate in an IC mode, requesting Physical Resource Block (PRB) utilization information for the second CSG node, receiving the PRB utilization information for the second CSG node, and determining, based on the received PRB utilization information, an ICIC operating ratio, wherein instructing the second CSG node causes the second CSG node to operate in an IC mode based on the ICIC operating ratio.

Certain embodiments are directed to a first node operable to reduce interference in a communication network including a first node coverage area, a second closed subscriber group (CSG) node, transmitting on a bandwidth at a lower power than the first node and located within the first node coverage area, and one or more user equipment (UE) devices located within the first node coverage area. The first node includes a processor; a memory coupled to the processor, a transceiver coupled to the processor, and an antenna coupled to the transceiver configured to transmit and receive signals. The processor is configured to receive link quality measurement (LQM) information from the one or more UE devices and to determine, based on the received link quality measurement information, if a link quality value for a first UE device of the one or more UE devices is below a predetermined link quality threshold value. If the link quality value is below the predetermined link quality threshold value, the processor is further configured to determine, based on the received link quality measurement information, if the link quality value degradation is caused by the second CSG node. If the link quality value degradation is caused by the second CSG node, the processor is further configured to determine if the first UE device is a member of the second CSG node and, if not a member, the processor is further configured to determine if the first UE device includes an interference cancellation (IC) capability and, if the first UE device does not include an IC capability, the processor is further configured to instruct the second CSG node to operate in an IC mode that mutes transmission of the second CSG node on a part of the bandwidth causing interference for the first UE device. If the first UE device does not include an IC capability, the processor is further configured to initiate a handshake between the first node and the second CSG node to identify a part of bandwidth for muting transmission and to instruct the second CSG node to operate in an IC mode that mutes transmission of data and/or reference signals causing interference for the first UE device on the identified part of the bandwidth.

In particular embodiments, the node processor is further configured to instruct the second CSG node to send a list of UE devices that are members of the second CSG node, to receive, at the first node, the list of member UE devices, and to search the received list of member UE devices to determine if the first UE device is a member of the second CSG node.

Particular embodiments provide a method for reducing interference in a communication network including a first node and a first node coverage area, a second closed subscriber group (CSG) node, transmitting at a lower power than the first node and located within the first node coverage area, and one or more user equipment (UE) devices located within the first node coverage area. The method includes receiving, at the second CSG node, a request for Physical Resource Block (PRB) utilization from the first node, requesting, by the second CSG node, interference cancellation (IC) capability of the one or more UE devices, receiving an IC capability report from the first node for the one or more UE devices, and determining if the one or more UE devices is IC capable based on the received capability report. If any of the UE devices are not IC capable, the method further includes reporting the PRB utilization to the first node; receiving, from the first node, instructions for the second CSG node to operate in an interference cancellation (IC) mode with a (X:Y) operating ratio, and switching, at the second CSG node, to an IC mode that mutes transmission of reference signals causing interference for the UE devices.

In some embodiments, the method further includes determining if the received (X:Y) operating ratio is acceptable and, if the received (X:Y) operating ratio is acceptable, the method further includes operating in an interference cancellation (IC) mode with the received (X:Y) operating ratio.

In another particular embodiment, a closed subscriber group (CSG) node is provided for reducing interference in a communication network including a first node and a first node coverage area, and one or more user equipment (UE) devices located within the first node coverage area, the CSG node transmitting at a lower power than the first node and located within the first node coverage area. The CSG node includes a processor; a memory coupled to the processor, a transceiver coupled to the processor, and an antenna coupled to the transceiver configured to transmit and receive signals. The processor is configured to receive, at the CSG node, a request for Physical Resource Block (PRB) utilization from the first node, to request, by the CSG node, interference cancellation (IC) capability of the one or more UE devices, to receive a IC capability report from the first node for the one or more UE devices, and to determine if the one or more UE devices is IC capable based on the received capability report. If any of the UE devices are not IC capable, the processor is further configured to report the PRB utilization to the first node, to receive, from the first node, instructions for the CSG node to operate in an interference cancellation (IC) mode with a (X:Y) operating ratio, and switch, at the CSG node, to an IC mode that mutes transmission of reference signals causing interference for the UE devices.

Some embodiments further provide for the processor being further configured to determine if the received (X:Y) operating ratio is acceptable and, if the received (X:Y) operating ratio is acceptable, the processor is further configured to operate the CSG node in an interference cancellation (IC) mode with the received (X:Y) operating ratio.

In another particular embodiment, a method is provided for reducing interference in a communication network including a first node and a first node coverage area, a second closed subscriber group (CSG) node, transmitting at a lower power than the first node and located within the first node coverage area, and one or more user equipment (UE) devices located within the first node coverage area. The method includes detecting interference at the second CSG node and determining if the detected interference in uplink is from one or more UE devices that is not connected to the second CSG node. If the detected interference is from one or more UE devices that is not connected to the second CSG node, the method further includes determining if the detected interference is greater than a predetermined interference threshold. If the detected interference is greater than a predetermined interference threshold, the method further includes requesting, by the second CSG node, the interference cancellation (IC) capability of the interfering UE devices, receiving, at the second CSG node, an IC capabilities report from the first node, determining if the interfering UE devices are IC capable based on the received capability report and, if any of the interfering UE devices are not IC capable, the method further includes switching, at the second CSG node, to an IC mode that mutes transmission of reference signals to protect the UEs connected to the first node from interference from the CSG node in the downlink. The method further includes, if any of the interfering UE devices are not IC capable, initiating a handshake between the first node and the second CSG node to identify a part of bandwidth for muting data transmission and switching, at the second CSG node, to an IC mode that mutes transmission of data causing interference for the first UE device on the identified part of the bandwidth.

In other particular embodiments, a closed subscriber group (CSG) node is provided for reducing interference in a communication network including a first node and a first node coverage area, and one or more user equipment (UE) devices located within the first node coverage area, the CSG node transmitting at a lower power than the first node and located within the first node coverage area. The CSG node includes a processor; a memory coupled to the processor, a transceiver coupled to the processor, and an antenna coupled to the transceiver configured to transmit and receive signals. The processor is configured to detect interference at the CSG node, to determine if the detected interference is from one or more UE devices that is not connected to the CSG node and, if the detected interference in uplink is from one or more UE devices that is not connected to the CSG node, the processor is further configured to determine if the detected interference is greater than a predetermined interference threshold. If the detected interference is greater than a predetermined interference threshold, the processor is further configured to request, by the CSG node, the interference cancellation (IC) capability of the interfering UE devices, receive, at the CSG node, an IC capabilities report from the first node, and to determine if the interfering UE devices are IC capable based on the received capability report. If any of the interfering UE devices are not IC capable, the processor is further configured to switch, at the CSG node, to an IC mode that mutes transmission of reference signals causing the detected interference. Further, if any of the interfering UE devices are not IC capable, the processor is further configured to initiate a handshake between the first node and the second CSG node to identify a part of bandwidth for muting data transmission and to switch, at the second CSG node, to an IC mode that mutes transmission of data causing interference for the first UE device on the identified part of the bandwidth.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIGS. 10A and 10B are illustrations of exemplary request and response messaging between a source macro BS and a target CSG BS according to exemplary embodiments.

DETAILED DESCRIPTION

Particular embodiments are directed to methods and devices for reducing interference in heterogeneous communication networks based on inter-cell interference coordination.

Figure 1A:
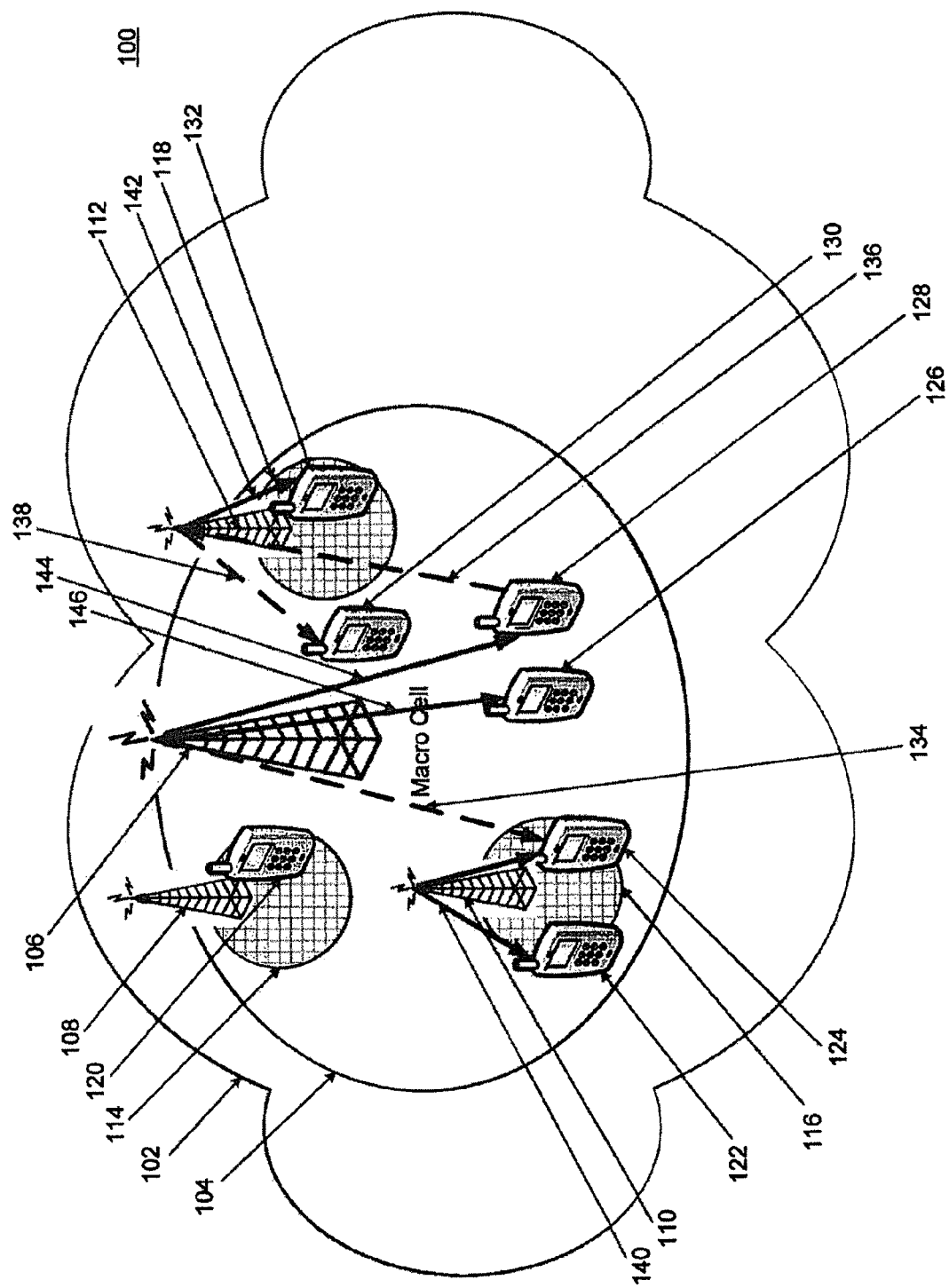
FIG. 1A is an illustration of the multi-layer architecture of a wireless heterogeneous communication network, showing a macro cell with low power CSG cells.

Referring now to FIG. 1A, an architecture of a wireless communication system 100 with a heterogeneous network deployment is illustrated. As shown, wireless communication system 100 includes a wireless network 102, macro node 106 and low power CSG nodes 108-112, and mobile devices 120-132. Examples of node 106 include base stations and relay nodes, such as, for example, high power, and macrocell base stations and relay nodes. Examples of nodes 106-108 include base stations and relay nodes, such as, for example, low power, micro, pico, and femto base stations and relay nodes. Examples of mobile devices 120-132 include wireless User Equipment (UE) and communication devices, such as, for example, mobile telephones, personal digital assistants, electronic readers, portable electronic tablets, personal computers, and laptop computers.

Figure 1B:
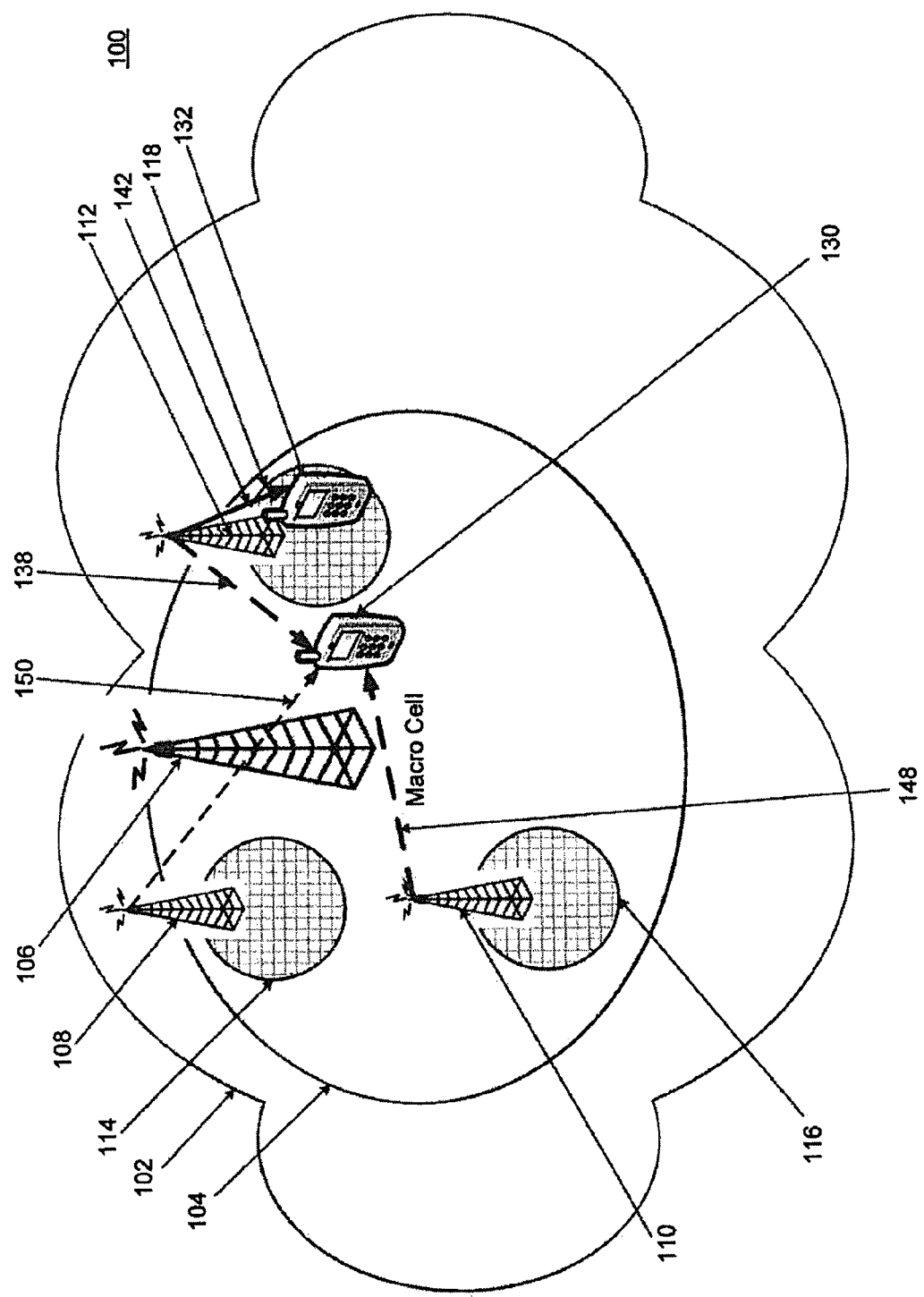
FIG. 1B is an illustration of major interference scenarios that can be observed in a heterogeneous communication network.
Figure 2:
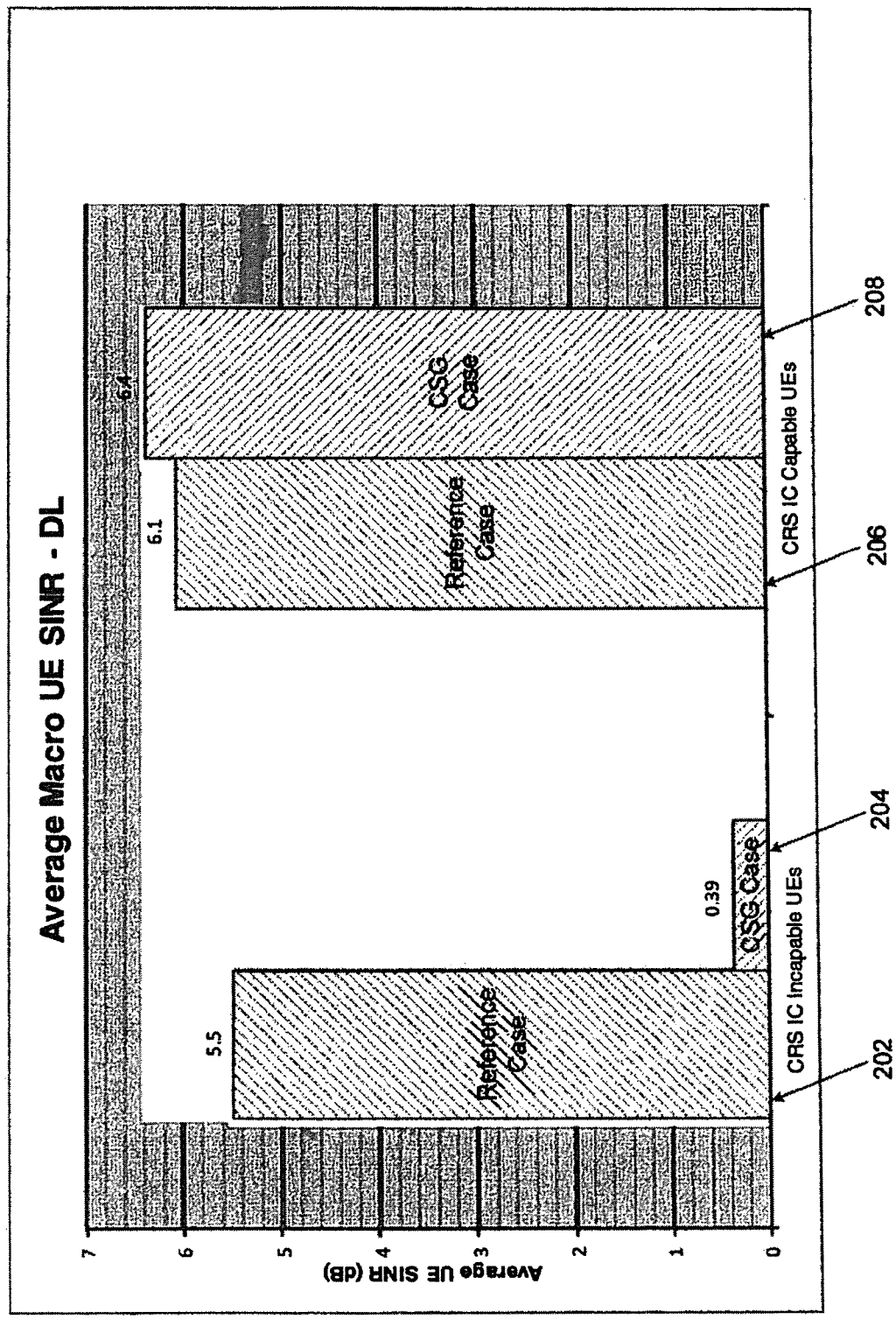
FIG. 2 illustrates exemplary downlink Signal to Interference-plus-Noise Ratio (SINR) of macro UEs for CSG UEs with and without CRS IC capability.
Figure 3:
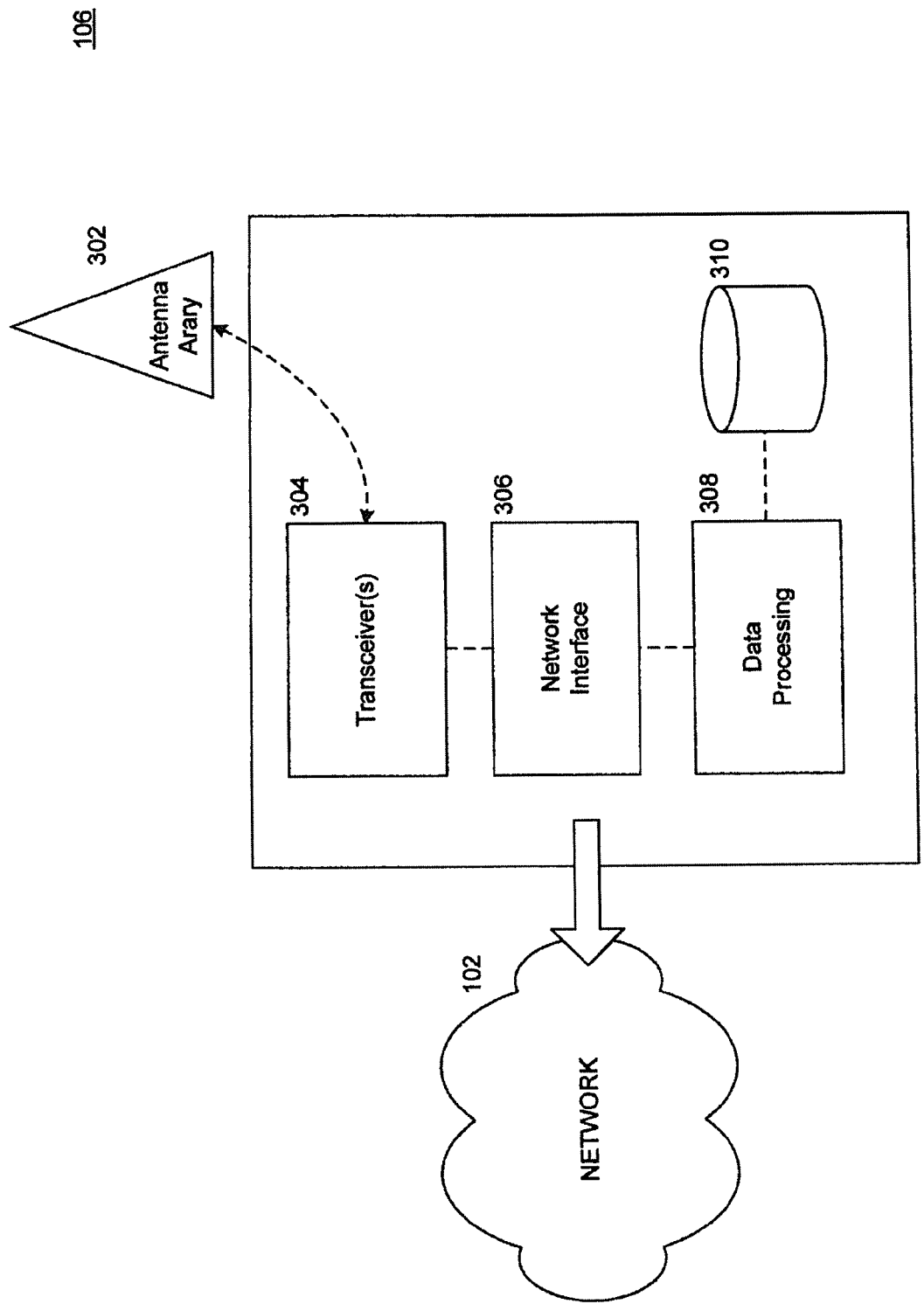
FIG. 3 is a block diagram of a node, as used for example in the system of FIGS. 1A and 1B, in accordance with exemplary embodiments.

Referring now to FIG. 3, a block diagram of nodes 106-112, as used in the system of FIGS. 1A and 1B in accordance with exemplary embodiments, is illustrated. As shown in FIG. 3, nodes 106-112 may include: a data processing system 308, which may include one or more microprocessors and/or one or more circuits, such as an application specific integrated circuit (ASIC), Field-Programmable Gate Arrays (FPGAs), and the like; network interface 306; and a data storage system 310, which may include one or more non-volatile storage devices and/or one or more volatile storage devices (e.g., random access memory (RAM)). The network interface 306 is connected to a transceiver 304, which is configured to transmit and receive signals via an antenna array 302. In embodiments where data processing system 308 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that, when executed by a processor, the code causes the data processing system 308 to perform steps described below (e.g., steps described below with reference to the flow charts shown in FIGS. 6A-9). In other embodiments, the nodes 106-112 are configured to perform steps described above without the need for code. That is, for example, the data processing system 308 may consist merely of one or more ASICs. Hence, the features of the present embodiments described above may be implemented in hardware and/or software. For example, in particular embodiments, the functional components of the nodes 106-108 described above may be implemented by the data processing system 308 executing computer instructions, by the data processing system 308 operating independent of any computer instructions, or by any suitable combination of hardware and/or software.

Figure 4:
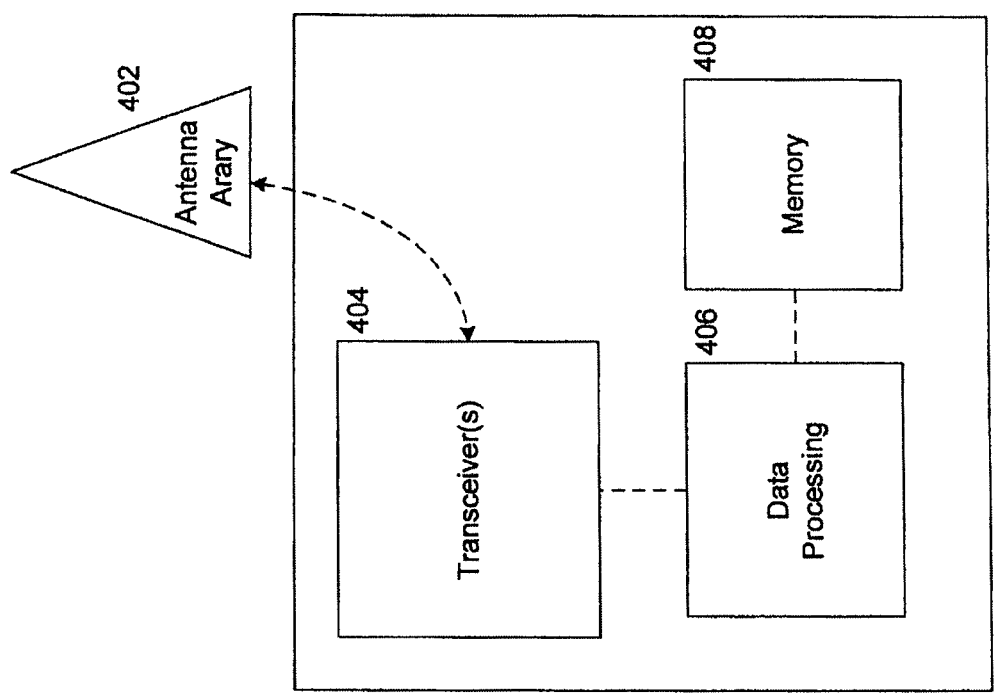
FIG. 4 is a block diagram of a mobile user equipment (UE) device, as used for example in the system of FIGS. 1A and 1B, in accordance with exemplary embodiments.

Referring now to FIG. 4, a block diagram of a mobile device, shown as exemplary device 120 used in the system of FIGS. 1A and 1B in accordance with exemplary embodiments, is illustrated. As shown in FIG. 4, the mobile device 130 may include: a data processing system 406, which may include one or more microprocessors and/or one or more circuits, such as an application specific integrated circuit (ASIC), Field-Programmable Gate Arrays (FPGAs), and the like; a transceiver 404 for transmitting data to (and receiving data from) nodes 106-108 via an antenna array 402; and a memory 408, which may include one or more non-volatile storage devices and/or one or more volatile storage devices (e.g., random access memory (RAM)). In embodiments where data processing system 406 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the mobile device 130 to perform steps described below (e.g., steps described below with reference to the flow charts shown in FIGS. 6A-9). In other embodiments, mobile device 130 is configured to perform steps described above without the need for code. That is, for example, data processing system 406 may consist merely of one or more ASICs. Hence, the features of the present invention described above may be implemented in hardware and/or software. For example, in particular embodiments, the functional components of mobile device 130 described above may be implemented by data processing system 406 executing computer instructions, by data processing system 406 operating independent of any computer instructions, or by any suitable combination of hardware and/or software.

Figure 5:
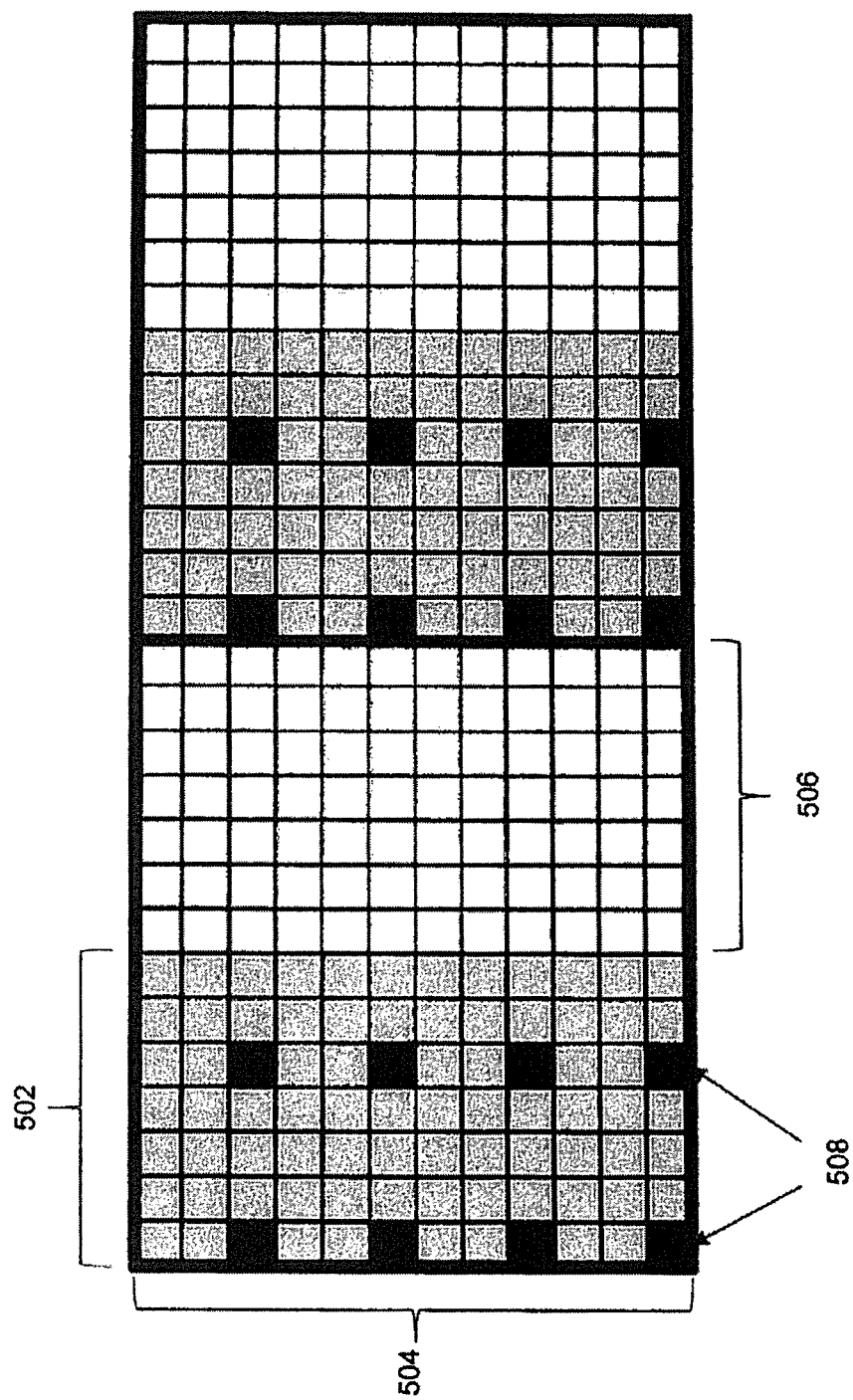
FIG. 5 is an illustration of the muting of transmission of Cell-specific Reference Signals (CRS) and data both on 50% of the sub-frame length, with the light shaded part showing that data is being transmitted and the dark shaded squares show the CRS signals.

Particular embodiments are implemented consistent with the concept of Carrier Aggregation (CA), which advocates the use of separate bandwidth spectrum among the macro layer 104 and each of the LPN femto layers 114-118 to avoid interference problems between the different cell layers. Certain embodiments limit the interference generated by the CSG cells by de-activating the transmission from the CSG cells on a certain part of the sub-frames from the CSG cells. Referring to FIG. 5, two subframes are shown, in which the CSG mute their transmissions on part of each subframe. Specifically, in FIG. 5., the transmission is muted on 50% of the sub-frame, which occurs in every sub-frame. In contrast to the Almost Blank Sub-frames (ABS) technique where the CRS signals are transmitted even in the sub-frame when cells mute their transmissions, the CA technique entails the transmission of CRS signals only on the part of sub-frame 502 where the cells are active, as shown in FIG. 5. In the transmission of signals from the CSG layer 504, CRS signals 508 are transmitted only on part of the sub-frame 502 where the cells are active and are not transmitted on the part of the sub-frame 506 where the cell's transmission is muted.

In one embodiment, the UEs 126-130 report their respective Cell-specific Reference Signal Interference Cancellation (CRS-IC) capabilities to the macro cell 104, which identifies whether the macro UEs which are not able to perform CRS-IC are experiencing high interference from the CSG cells 114-118. If this lack of CRS-IC capability is determined, the serving macro BS 106 instructs the closest CSG LPN 112 (or a group of CSG LPNs 108-112 in close proximity or even the entire CSG LPN layer) to trigger the CA-based Inter-Cell Interference Coordination (ICIC) technique and accordingly mute the CSG LPN's 112 transmission on a certain part of the sub-frame 506 depending on the Physical Resource Block (PRB) utilization switch to Hybrid Access (HA) mode and thereby provide temporary access to specific UEs 130. The CSG cell 118 determines if the traffic load in the cell 118 permits it to be silent for the requested amount of time and responds to the macro cell's 106 request by (ACK or NACK messaging). In this way, the amount of interference generated by the transmission of CRS signals is reduced, and the UEs 130 which lack CRS interference cancellation capabilities obtain better service conditions. The interference is reduced not only due to the CRS signals but also the one resulting from the data transmission. The CSG mutes both CRS signals and the data transmission on part of the bandwidth as specified by the ICIC operating ratio. These embodiments improve the overall link quality measurements (LQM) of the UEs 126-130 and reduce the cell edges effect without having impact on the performance of CSG cell 118 itself.

Figure 6A:
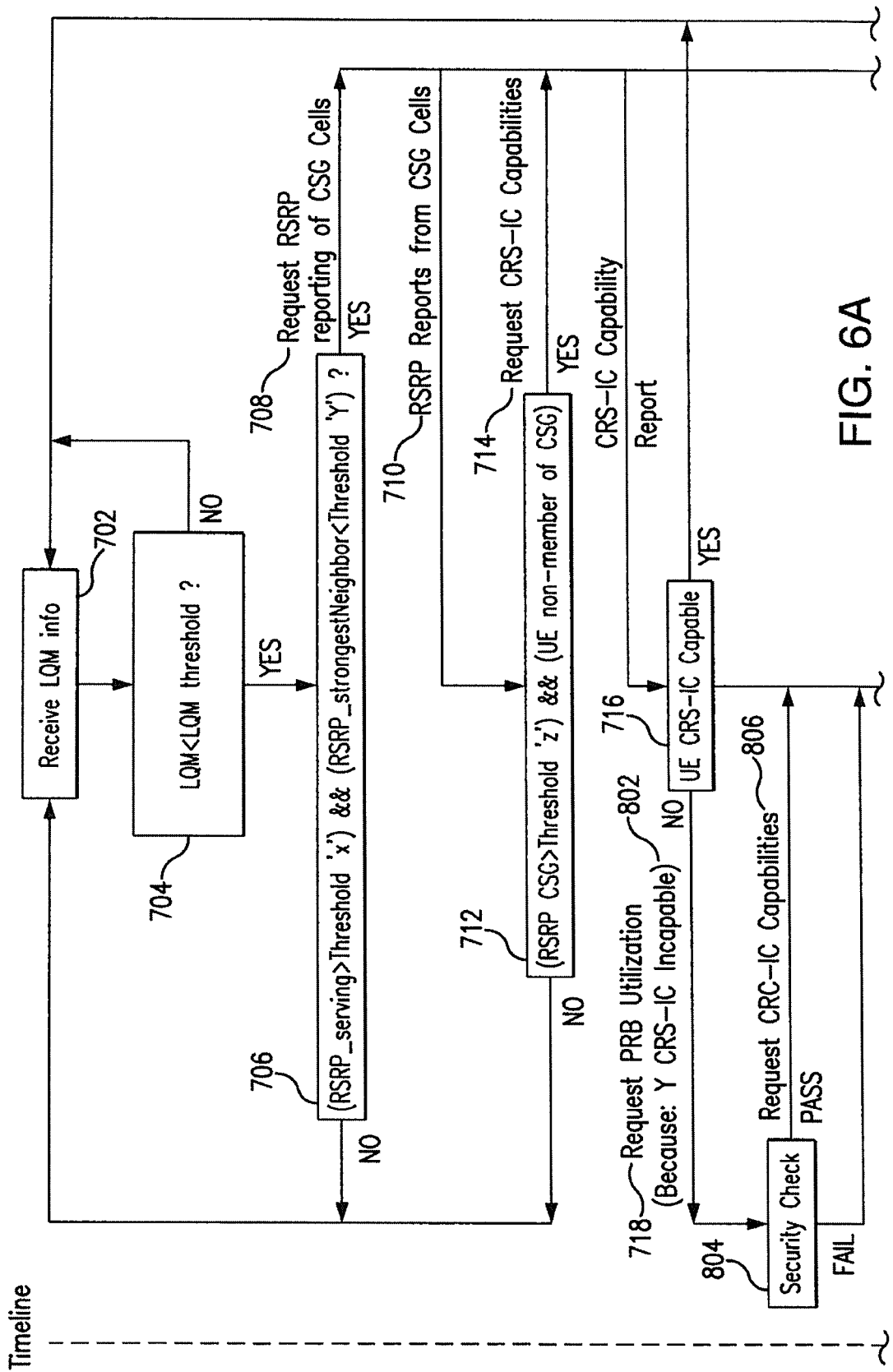
FIGS. 6A and 6B are flow charts illustrating the steps in a method for reducing interference in a heterogeneous communication network according to exemplary embodiments, from the perspective of a CSG BS, a macro BS, and a macro UE device.
Figure 6B:
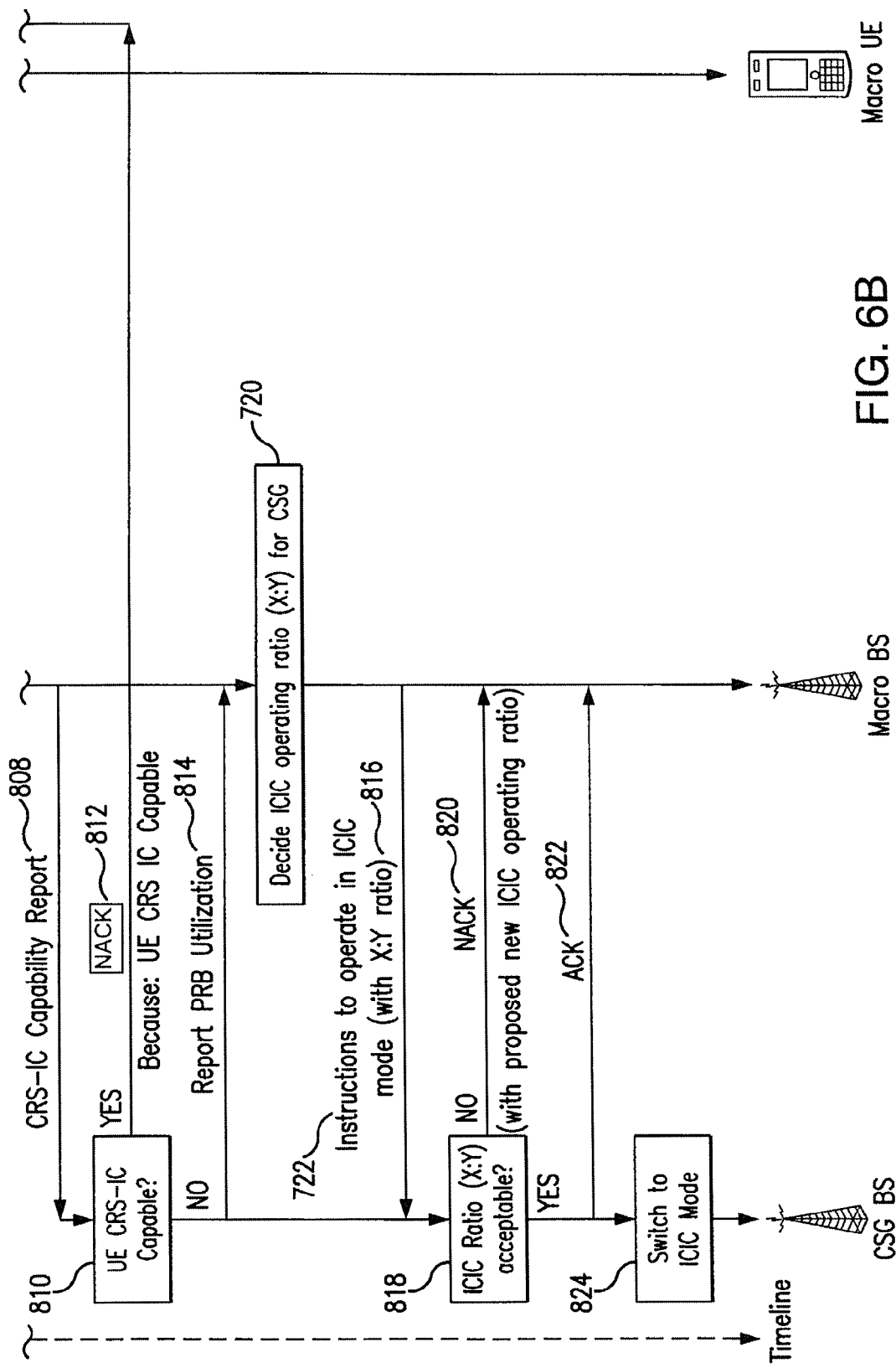

An exemplary embodiment begins with the steps to confirm occurrence of the condition where the macro cell 106 identifies that the UEs 126-130 connected to it are experiencing severe interference from nearby CSG cells 114-118 in the macro cell area 104. Once this interference is determined, the macro cell 106 triggers the CSG cells 114-118 in the second block to enable the ICIC scheme to protect the nearby macro UEs 126-130. FIGS. 6A and 6B are flow charts illustrating the details of reducing interference in a heterogeneous communication network according to exemplary embodiments, from the perspective of a CSG LPN 108-112, a macro BS 106, and a macro UE device 126-130.

Figure 7:
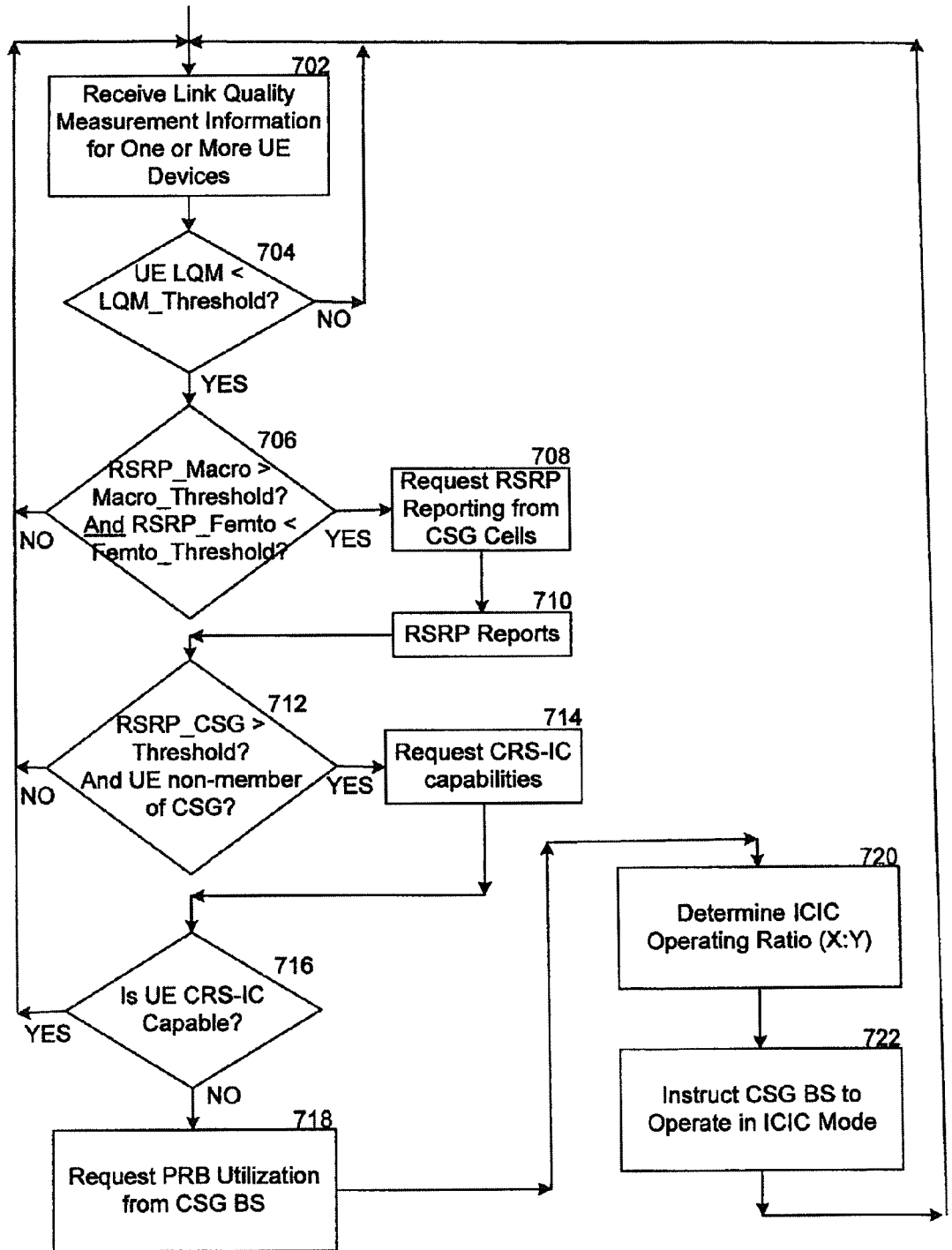
FIG. 7 is a flow chart illustrating the steps performed by a macro base station in a method for reducing interference in a heterogeneous communication network according to exemplary embodiments.

Referring now to FIGS. 6A, 6B, and 7, there are shown flow charts illustrating the steps in methods for reducing interference in a heterogeneous communication network, from the perspective of a macro BS 106. FIGS. 6A and 6B additionally illustrate the sequential message exchange between the macro BS 106, the CSG BS 112, and the UEs 130 involved in the procedure.

In a HetNet deployment where CSG LPNs 108-112 are deployed within the macro base station's (BS) 106 coverage area 104 (this information can be available at macro base stations 106 in the area 104 where CSG LPNs 114-118 are deployed), the procedure of receiving link quality measurements from UEs 126-130 in the macro cell 104 is performed at step 702. This procedure involves reception of Channel Quality Indicator (CQI), Reference Signal Received Power (RSRP), Reference Signal Received Quality (RSRQ), etc. Based on reported measurements by User Equipments (UEs) 126-130, the link quality measurements of UEs 126-130 in the cell 104 can be estimated at the macro base station 106. Thereby, the link quality measurements of the links to the UEs 126-130 can be known at the macro base station 106. Further, the Signal to Interference-plus-Noise Ratio (SINR) for the UEs 126-130 is known at the macro BS 106 based on the received signal strength from the UEs 126-130. For purposes of simplicity of expression and not limitation, the term, Link Quality Measurement (LQM), will be used hereafter to represent any type of link quality measurements for the UEs 126-130, including SINR. Exemplary threshold values can be utilized, for example and not limitation, from Table 6.5.1.1 of 3GPP TS 32.762. For example, an acceptable minimum RSRP threshold quality value could be −140 dBm. In addition, exemplary values that can be utilized for X may be greater than −140 dBm and exemplary values that may be utilized for Y may be less than −140 dBm. Other values may also be used dependent on operator preference.

At step 704, the macro base station checks the quality of the received LQM information to determine if it is below a given LQM threshold level value, LQM_Threshold. In particular, the link quality measurement of the UE 126-130 is compared against a predetermined threshold value to determine if the link quality is below an acceptable level. A low LQM level can be a result of either (1) poor signal strength from the serving BS 104 (the macro BS 104 where this check is done), as a result of (2) high other cell interference from other than the CSG neighbor cells 114-118, or as a result of (3) high other cell interference originated from the CSG cell 114-118. To determine if the low signal quality is due to the presence of a neighbor CSG cell 114-118, at step 706 the RSRP levels from the serving BS 104 and from the strongest interfering neighbor base station 112 are checked at the macro BS 106. Namely, it is checked whether both (a) the RSRP from the serving base station 104 is good; i.e., it is higher than a given first RSRP threshold, and (b) the RSRP from the strongest neighbor base station, either a neighbor macro base station or an Open Access (OA) femto base station within the macro BS's 106 coverage area 104, is below a given second RSRP threshold. This interfering neighboring base station can be termed a third node, as compared to the macro first node BS 106 and the CSG second nodes 108-112 generally. Finding both (a) and (b) is an indicator of the presence of a CSG cell 114-118 in close proximity (i.e., neighboring) to the macro UE devices 126-130. As a form of verification, the serving BS 106, at step 708, requests the UE 126-130 to start RSRP reporting of nearby CSG cells 114-118.

At step 710, and referring also to FIG. 1B, the macro BS 106 receives the RSRP reports for neighbor CSG cell 118 from the UE 130, and at step 712 the macro BS 106 determines if the RSRP of a CSG cell 118 is greater than a certain threshold value, and that the UE 130 is not a member of this CSG 118. The occurrence of this dual condition confirms that the interference 138 at UE 130 is caused from the CSG neighbor cell 118.

Determining if the UE 130 is a member of a particular CSG 118 can be accomplished by, for example, two ways:

(1) The macro BS 106 instructs the CSG BS 112 send its "CSG White List", which contains a record of the UEs 132 having access to the CSG cell 118. The macro BS 106, upon receipt of this list, can search the list and determine if this specific UE 130 is a member of the target CSG 118 or not.

(2) The macro BS 106 sends a request to the CSG cell 118 to determine if this designated UE 130 is a member of the CSG cell 118 or not. The CSG cell 118 performs a check on its "CSG White List" and responds to the macro BS 106 with an ACK or NACK message.

By the completion of step 712, it has been determined whether the low LQM level for the macro UE 130 is mainly the result from cell interference 138 originating from a neighbor CSG cell 118, and the UE 130 cannot avoid this interference because it is not a member of this CSG cell 118. Once it has been established that the macro UE 130 is suffering from interference from the CSG cell 118, and the UE 130 is a non-member of the CSG cell 118, the next procedure is to determine if the Inter-Cell Interference Coordination (ICIC) scheme can or should be triggered at the CSG cell 118 or not. This can be accomplished by using different levels of granularity, for example: (1) enabling ICIC only on the most significant aggressing CSG cell 118 to protect the macro UE 130; (2) enabling ICIC on a set of CSG cells 112-118 that are in close proximity to the UE 130 experiencing severe interference from CSG cells; or (3) enabling ICIC across the entire CSG LPN cell layer.

The levels of granularity at which the ICIC scheme can be enabled are a function of the traffic in the macro cell area 104 (Physical Resource Block (PRB) utilization) and the distribution of the users 126-130. For the case when the macro cell 104 is heavily loaded (high PRB utilization), the probability of a UE 126-130 being interfered by the CSG BSs 108-112 is relatively high. Also, in the case where the macro users 126-130 are higher in density in regions with CSG cell clusters, it is expected that the macro UEs 126-130 will experience higher interference.

The macro BS 106 can detect (1) how many UEs 126-130 in its coverage area 104 are affected by transmissions from CSG BSs 108-112 and (2) the number of CSG BSs 108-112 that are interfering with the UEs 126-130 detected in (1). In a first embodiment, the macro BS 106 handles the target BSs 108-112 where the ICIC will be triggered: If the number UEs 126-130 interfered by CSG cells is <X, then the macro BS 106 will enable ICIC at the most significant aggressor 108-112. If the number of UEs 126-130 interfered by CSG cells is >X<Y, then enable ICIC on a set of CSG cells 108-112 in close proximity to the UE 126-130 experiencing severe interference. If the number of UEs 126-130 interfered by CSG cells is >Y, then enable ICIC across the entire CSG LPN cell layer 114-118.

In a particular embodiment, CSG BSs 108-112 trigger ICIC mechanisms by themselves based on uplink (UL) interference, as shown by signal 136 in FIG. 1A. The PRB utilization, or the traffic load, in the macro cell 104 will impact the interference received by the CSG cell 114-118 in the UL. For the case when UEs 126-130 belonging to the macro cell 104 are located close to the CSG cells 114-118 in higher densities, the CSG cells 114-118 will experience high UL interference. This information can be used to independently trigger the ICIC at the CSG cells 114-118.

If the UL interference experienced at CSG is >X, then enable ICIC in the downlink (DL) to protect the macro UEs 126-130. The CSG cell 114-118 can use its PRB utilization to determine a suitable ICIC ratio in this case as explained below.

In the embodiments illustrated by FIGS. 6A-9, the first of the above three described levels of granularity is exemplified where the ICIC scheme is triggered only on the most significant CSG aggressor 118. This procedure can be extrapolated to the above second and third described levels of granularity with only minor adjustments by expanding the triggering of the ICIC scheme for additional CSG cells.

Referring to FIG. 7, to determine if the ICIC scheme can or should be enabled at the CSG cell 118 causing the severe interference, the macro cell 106 first determines, at step 716, if the victim UE 130 is capable of cancelling CRS interference (CRS-IC) from neighbor CSG cells 118. This determination is accomplished by first requesting, by the macro BS 106, at step 714, the CRS interference cancellation capabilities of the interfered UEs 130. The procedure of identifying the CRS-IC capabilities of a UE 130 is also discussed below with reference to FIG. 8. If the UE 130 is determined to be CRS-IC capable at step 716, the macro BS 106 need not take any further action because it is anticipated that the macro UE 130 will not be considerably affected by the interference 138 created by the CRS from the neighbor CSG cell 118 because of the UE's 130 interference cancelation capabilities, and the process reverts back to step 702 to determine, or await, receipt of link quality measurements from the macro UEs 126-130.

However, in case the UE 130 cannot cancel interference originating from CRSs from the neighbor CSG cell 118, then, at step 718, the macro BS 106 starts the procedure to trigger an ICIC scheme at the CSG cell 118 to protect the victim UE 130. To initiate the ICIC mechanism, the macro cell 104 needs to know the Physical Resource Block (PRB) utilization of the aggressing CSG cell 118 to determine the appropriate ICIC operating ratio (X:Y). The need for this information arises from 3GPP specifying different ratios for the operation of Carrier Aggregation (CA)-based ICIC mechanisms, including 1:4 and 1:8 ratios, for example and not limitation, where the CSG cells 114-118 mute their transmissions on 25% and 12.5% of the bandwidth, respectively. However, based on performed simulations, the PRB utilization of the CSG BSs 108-112 often does not exceed 10%, even for a heavily loaded traffic scenario. Thus, more aggressive muting ratios can be employed at the CSGs 114-118 based on the operators' strategy.

The ICIC operating ratio can be a function of the PRB utilization of the CSG cells alone, or both the macro cell 104 and the CSG cells 114-118. The ratio can also be modified by the operators, depending, for example, on whether they would prefer an aggressive approach to the ICIC ratio or a more subtle one. There can be several ways to calculate the ratio, such as, for example:

(1) Based on CSG Cell PRB utilization only:
If the PRB utilization of CSG cell <A %, then use an ICIC Ratio (X1:Y1);
if the PRB utilization of CSG cell >A %<B %, then use an ICIC Ratio (X2:Y2);
if the PRB utilization of CSG cell >B %<C %, the use an ICIC Ratio (X3:Y3);
if the PRB utilization of CSG cell >C %, then use an ICIC Ratio (X4:Y4), where A<B<C. The Ratio (X1:Y1) comprises X1: number of inactive frames and Y1: total number of frames in the CSG cell 114-118, where Ratio(X1:Y1)>Ratio(X2:Y2)>Ratio(X3:Y3)>Ratio(X4:Y4).

(2) Based on the PRB utilization information of both the CSG 114-118 and the macro cells 104, an additional optimization of option 1 described above can be performed. In this case, the macro PRB utilization is also considered for calculating the ICIC Ratio, as follows:
If the macro PRB utilization <A1% and the CSG PRB utilization <B1%, then use an ICIC Ratio (X1:Y1);
If the macro PRB utilization >A1%<A2% and the CSG PRB utilization <B1%, then use an ICIC Ratio (X2:Y2);
If the macro PRB utilization >A2%<A3% and the CSG PRB utilization <B1%, then use an ICIC Ratio (X3:Y3);
If the macro PRB utilization >A3% and the CSG PRB utilization <B1%, then us an ICIC Ratio (X4:Y4). The Ratio (X1:Y1) comprises X1: number of inactive frames and Y1: total number of frames in the CSG cell 114-118, where Ratio(X1:Y1)>Ratio(X2:Y2)>Ratio(X3:Y3)>Ratio(X4:Y4).

Thus, at step 718, the macro BS 106 requests the aggressing CSG cell 118 for its PRB utilization and determines at step 720, based on the received PRB utilization, the ICIC operating ratio (X:Y) to be used. Having established the operating ratio (X:Y), the macro BS 106 then instructs the CSG cell 118 at step 722 to operate in ICIC mode with the specified ratio to protect the victim macro UE 130. Under the instructed ICIC mode, Carrier Aggregation (CA) is applied to the CSG cell 118 in question. Namely, the carrier aggregation policy determines that a ratio (X:Y) of the entire CSG transmission bandwidth is going to be used in the external zone of the CSG cell 118. In certain cases, this rule can be applied to the whole CSG cell 118.

The time period for the CSG 118 to be operating in ICIC mode is also dependent on the operator strategy and on the amount of traffic in the macro cell 104 and CSG cell 118. If the traffic load in the CSG cell 118 is not high, the ICIC scheme can be enabled for a relatively longer duration to protect the macro UEs 130 from the transmission of CRS signals. For example, and not limitation, exemplary duty cycles that can be utilized include, but are not limited to: 1/8, 2/8, 3/8, 4/8, and 3/20. This new ICIC policy is applied up to the moment of the next message arriving from the macro BS 106. This ICIC mode time period during which a specific policy is active depends on such factors as the load in the CSG 118, the activity of the UE 130 receiving this high interference, among others.

It is noted here that the above discussion has described embodiments primarily from the perspective of the macro BS 106. The following discussion describes embodiments from the perspective of the CSG BS 112, where the macro BS 106 has proposed an operational bandwidth with the operating ratio (X:Y); and the CSG BS 112 can either accept or reject the proposal of the macro BS 106.

Figure 8:
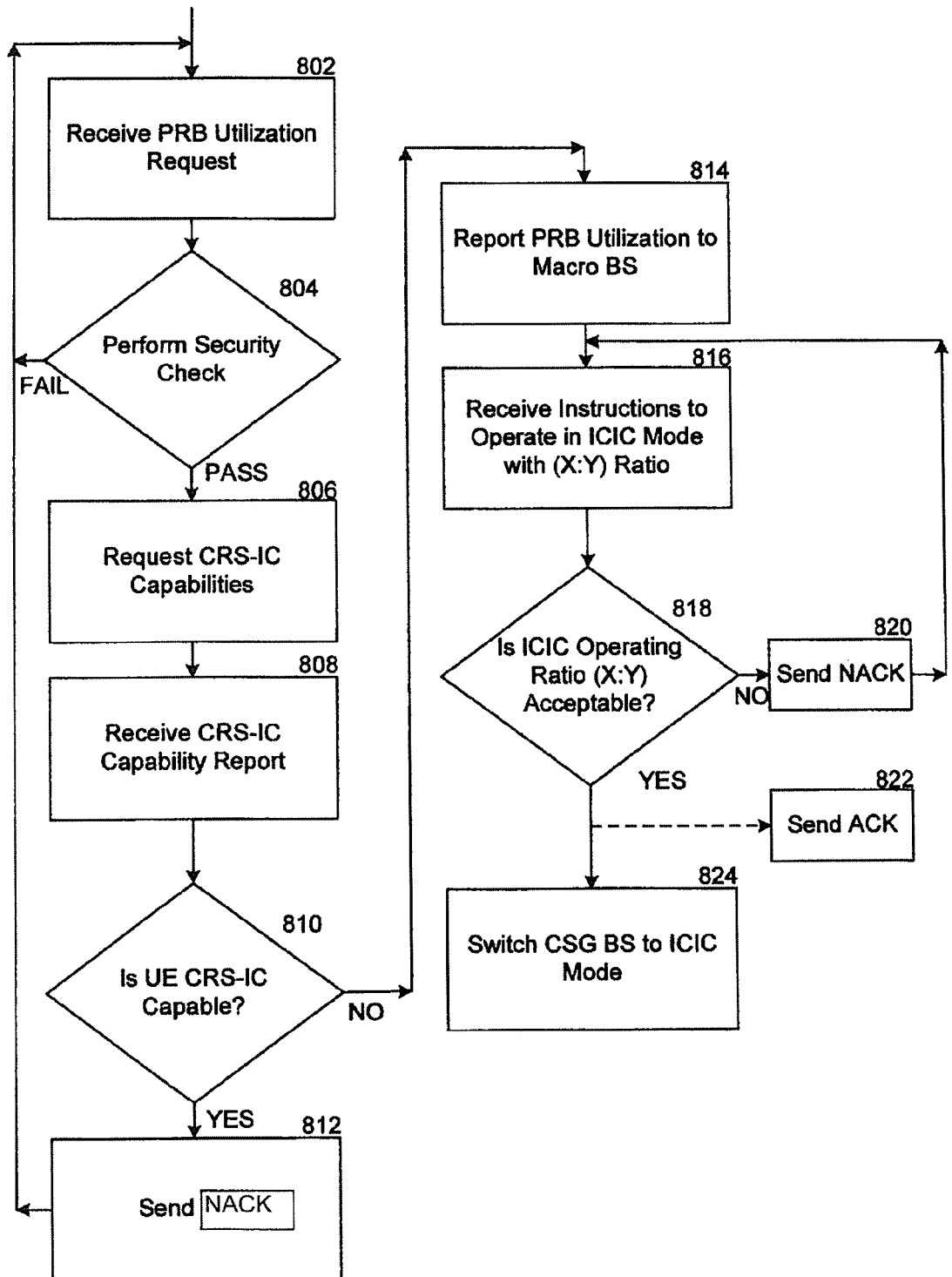
FIG. 8 is a flow chart illustrating the steps performed by a CSG base station in a method for reducing interference in a heterogeneous communication network according to exemplary embodiments.

Referring now to FIGS. 6A, 6B, and 8, flow charts are provided illustrating the steps performed by a CSG base station 112 in methods for reducing interference in a heterogeneous communication network. At step 802, the CSG base station 112 receives a request from the macro BS 106 to report its Physical Resource Block (PRB) utilization so that the macro BS 106 can determine an appropriate ICIC (bandwidth) operating ratio (X:Y) based on the traffic in the CSG cell 118. The request contains the UE's 130 Cell Radio Network Temporary Identifier (C-RNTI), Temporary Mobile Subscriber Identity (TMSI), or any other form of the UE's 130 identity and, optionally, the reason for requesting the PRB utilization information. Upon receipt of this request, the CSG BS 112 optionally performs a security check at step 804 to determine if the PRB request from the macro BS 104 has included a reason for the requesting the information. If no reason has been provided, the CSG BS 112 can reject the request in one of several ways, including transmitting NACK to the macro BS 106 at step 820. Otherwise, the CSG BS 112 asks the macro BS 106 (at step 806) to transmit information about the CRS interference cancellation capabilities of the UE 130, to obtain the CRS-IC capability of the UE 130 and/or to alternately verify the legitimacy of the PRB utilization request.

At step 808, the CSG BS 112 receives the response from the macro BS 106, with the information on the specific UE's 130 CRS IC capability. At step 810, the CSG BS 112 checks if the UE 130 is able to cancel CRS interference from neighboring cells 118. If the UE 130 is CRS-IC capable, the CSG cell 118 transmits NACK to the macro BS 106 at step 812 to inform the macro cell 106 that the interfered UE 118 is capable of canceling the CRS interference.

Steps 804, 806, and 808 can be considered optional, but can be performed as an additional security measure performed at the CSG BS 112 for verifying the legitimacy of the macro BS 106 information request made at step 802 and for subsequently permitting temporary access to the CSG BS 112 by the macro BS 106. However, the message transmitted by the serving BS 106 to the CSG BS 112 requesting PRB utilization information might already contain the reason for asking the temporary access by the macro BS 106 to this CSG cell. Further, the UE 130 might be indicated as not being capable of CRS-IC, in which case these steps are necessary to subsequently initiate the appropriate CRS interference cancellation at the UE 130.

If the designated UE 130 is determined to not be CRS-IC capable, the CSG BS 112 then discloses its PRB utilization to the macro BS 106 at step 814 for the macro BS 106 to determine an appropriate ICIC operating ratio (X:Y) at step 720. The ICIC (bandwidth) operating ratio (X:Y) is then communicated to the CSG BS 112 at step 816. The macro BS 106 can additionally include its own PRB utilization as part of the message to the CSG BS 112 containing the ICIC operating ratio (X:Y). This additional PRB utilization information can be used by the CSG BS 112 to determine the amount of time it should keep the ICIC scheme enabled, as discussed above. For high macro PRB utilization, muting part of the CSG bandwidth for longer periods can be beneficial by limiting the interference generated from the transmission of CRS signals for a longer period of time.

At step 818, the CSG BS 112 determines if the proposed operating frequency ratio (X:Y) is acceptable based on the PRB utilization of the CSG cell 118. If the ICIC (frequency) operating ratio (X:Y) is found to be acceptable, then the CSG BS 112 sends an ACK message to the macro BS 106 at step 822, and the CSG BS 112 switches to an ICIC mode at step 824 and mutes its CRS transmission on the part of the bandwidth specified by the ratio. However, if the ratio is deemed as unacceptable due to high CSG 118 traffic load, then a NACK message is sent to the macro BS 106 at step 820 with a proposed new ICIC operating ratio (X:Y) from the CSG BS 112, and the handshaking of steps 720 and 816-820 between the macro BS 108 and CSG cell 118 is repeated until agreement on the ICIC operating ratio (X:Y) is reached. Once the ICIC operating ratio is determined to be acceptable, the CSG BS 112 sends an ACK message to the macro BS 106 at step 822 and switches to the ICIC mode, as discussed above.

In a particular embodiment, where the UE 130 affected by interference from the CSG BS 112 is determined at step 716 to be capable of cancelling interference from the neighbor cells CRS transmissions, then the aggressor CSG BS 112 can be instructed to apply an evolved ICIC mode based on Almost Blank Sub-frames (ABS) or based on low power subframes. This solution is effective if the load in the CSG cell 118 is such that the use of ABS or the like technique instead of using ICIC based on carrier aggregation (CA) (frequency bandwidth division) is effective.

The CSG cells 114-118 are generally customer owned and customer deployed, often for home usage. Therefore, the customers pay an additional premium to buy the WiFi-like eNBs to be set up residentially to avoid coverage and capacity problems. In such cases, the requirement to mute CSG CRS transmissions for a certain period could be objectionable. In such cases, instead of completely muting the transmission of CRSs, the low power sub-frame technique can be used. This method entails the CSG BSs 108-112 transmitting at relatively lower powers for a certain time period to protect the macro UEs 126-130. The lower power transmissions limits the interference experienced by the macro UEs 126-130 and avoids the muting of CSG CRS transmissions at the same time. In general, the CSG cell 114-118 radius spans from 10 m to 15 m and, thus, this solution can be applied since the UEs 120-124 and 132 are located close to their serving CSG BSs 108-112 and, hence, the DL transmission power lever from these BSs 108-112 is still sufficient (even after DL power reduction) for acceptable communication. However, for the uncommon circumstances of larger radius CSG cells 114-118, limiting the transmission power from the CSG BSs 108-112 can lead to poor radio strength for the connected UEs.

Figure 9:
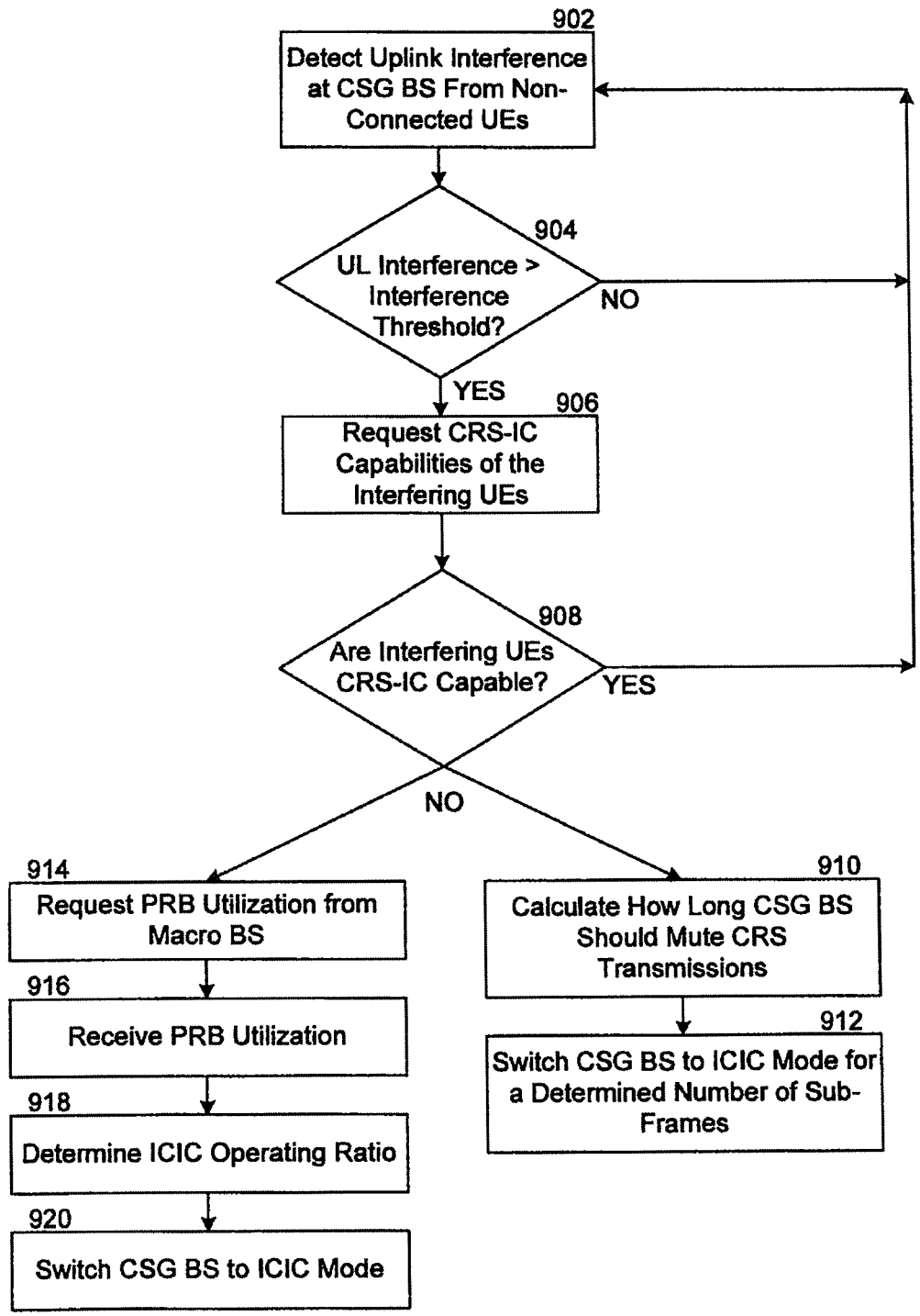
FIG. 9 is a flow chart illustrating the steps performed by a CSG base station in a method for reducing interference in a heterogeneous communication network according to an alternate exemplary embodiment.

Referring again to FIG. 1A and also to FIG. 9, another embodiment for triggering the ICIC mechanism to reduce interference at macro UEs 126-130 is the detection, at the CSG BS 112 (at step 902), of high uplink (UL) interference 136 from nearby UEs 128 that are not connected to that CSG BS 112. If the CSG BS 112 experiences high UL interference, it may mean there are macro UEs 128 located in close proximity and, therefore, the CSG BS 112 can likely also cause interference problems for these UEs 128 in the downlink (DL) 138 from the CSG BS 112. Upon detecting UL interference, the CSG BS 112, at step 904, checks to determine whether the UL interference is greater than a predetermined UL interference threshold value. If the level of interference is not greater than the threshold value, the process returns to step 902 to monitor possible UL interference at the CSG BS 112. Otherwise, at step 906, the CSG BS 112 requests, from the macro BS 106, the CRS IC capabilities of the interfering UEs 128. Upon receipt of the CRS IC capabilities report or information, the CSG BS 112, at step 908, checks whether any of the interfering UEs 128 are CRS-IC capable. If the UEs 128 are CRS-IC capable, the CSG BS 112 does nothing more, and interference checking can proceed at step 902. If any UEs 128 are not CRS-IC capable, then the process can alternately trigger one of at least two exemplary procedures.

In one particular embodiment, the CSG BS 112 can request PRB utilization from the macro BS 106 at step 914 to determine how long the CSG BS 112 should mute its CRS transmissions. A higher PRB utilization of the macro BS 106 indicates a higher traffic load in the macro cell 104; and, thus, a higher probability of macro users 126-130 being interfered by the CRS transmissions of the CSG BSs 108-112. Upon receipt of the PRB utilization information at step 916, the CSG BS 112 can determine, at step 918, the ICIC operating ratio (X:Y). At step 920, the CSG BS 112 switches to ICIC mode, and stops the transmission of both data and CRS signals on the specified part of bandwidth based on the determined ICIC operating ratio. Upon end of the ICIC mode period, the process returns to step 902 to monitor for, or detect, UL interference.

In another particular embodiment, the PRB utilization is not needed from the macro BS 106. Instead, the CSG BS 112 can monitor the UL interference 136 and can mute its transmissions as long as the uplink interference 136 exceeds the predetermined interference threshold level. Alternately, the CSG BS 112 can stop muting its transmissions after a predetermined or calculated number of sub-frames have been transmitted by the CSG BS 112, even if the UL interference 136 still exceeds the threshold. The maximum number of sub-frames can be pre-determined by the operator, or it can be calculated at step 910 based on the PRB utilization of the CSG cell 118: If the PRB utilization of the CSG cell 118 is <X %, then the maximum number of sub-frames to be transmitted in CRS muted form is A; and if the PRB utilization of the CSG cell 118 is >X %, then the maximum number of sub-frames to be transmitted in CRS muted form is B, where A>B. At step 912, the CSG BS 112 switches to ICIC mode, for the calculated number of sub-frames.

Several of the above descriptions involve embodiments in which the decisions and steps are based on a single UE 130 receiving high interference from the CRS transmissions from a neighbor CSG BS 112. These embodiments can be equally applied for the case where the interference is being experienced by a number, N, of macro UEs 126-130+. For example, the determination to switch to ICIC mode at steps 722 and 824 can be additionally based on frequency division or time division, based on whether the highest number, or an M number, of the UEs receiving high interference can cancel the interference or not.

The embodiments discussed here can optimally be applied to UEs 126-130 moving at low or medium speed. An additional advantage of these embodiments is that they are compatible with at least 3GPP LTE Rel. 8.

In terms of performance, implementation of these embodiments produce gains in DL transmissions in all performance measurements, such as cell edge UE SINR and the cell edge UE throughput. Moreover, enabling the ICIC scheme at the CSG cells 114-118 does not necessarily impact the CSG cell's performance, as the PRB utilization of the LPN cells is found to be less than 10% even for heavily loaded traffic scenarios, as discussed above.

Additional embodiments utilize the exchange of messages for performing handshakes between the macro BS 106 and the CSG BS 112 as part of the methods for reducing interference as explained above and as shown in FIGS. 6A-9. The messages below are described for the scenario where X2AP interface is connecting the serving macro BS 106 with the target CSG BS 112. Therefore, the terminology below is taken from the 3GPP TS 36.423 X2 Application Protocol specification (X2AP). For the circumstances where the X2 interface is not available, the communication between the serving macro BS 106 and the target CSG BS 112 can be accomplished via the S1AP interface. While the terminology for X2AP and its messages is somewhat different from the S1AP terminology, the content of the X2AP messages and its protocol mechanisms are similar as in S1AP.

As part of the above-described exemplary embodiments, the macro BS 106 and the CSG BS 112 perform a handshake at steps 718, 720, 722, 802, and 814 to exchange the PRB utilization information of the target BS 112. One of the procedures to perform this handshake is exemplified in FIG. 10A, where a separate X2AP message (i.e. a PRB utilization report request) is sent from the macro BS 106 to the target CSG BS 112 to inquire about the PRB utilization of the CSG cell 118. In this message, the source macro BS 106 instructs the CSG BS 112 to report its PRB utilization and also includes the reason for this request (i.e., for example, because the UE 130 is CRS-IC incapable and ICIC must be enabled). This information is used by the macro BS 106 to determine the proper ICIC operating ratio (X:Y) that is to be applied at the CSG cell 118.

The CSG BS 112 performs the (optional) security checks in steps 804, 806, and 808 of FIGS. 6A, 6B, and 8; and in the case of legitimate requests, the CSG BS 112 responds with a "PRB utilization report response" message to the macro BS 106 at step 812. However, in case of an unauthorized PRB utilization report request, a Negative-Acknowledgement can be sent back to the macro BS 106 by the CSG BS 112 with an included rejection reason for refusing the requested disclosure of information (e.g., for example, because: the UE 130 is CRS IC Capable).

The above exemplary embodiments also involve a handshake between the macro BS 106 and the CSG BSs 108-112 to establish the amount of bandwidth over which the CSG BSs 108-112 should mute their transmission, called the ICIC handshake, exemplified in FIG. 10B. Once the macro BS 106 acquires the information about the PRB utilization of the CSG cell at step 814, it decides the muting bandwidth of the CSGs (ICIC muting ratio) at step 720, and sends a request to the CSG BS 112 at step 722 to enable ICIC mode at the CSG BS 112 using the specified operating muting ratio. The target CSG BS 112 then inspects its PRB utilization and verifies whether it can enable the ICIC using the muting ratio specified by the source macro BS 106. If the ICIC muting ratio specified by the source macro BS 106 is deemed feasible, then the CSG BS 112 enables the ICIC mode and responds with an ACK in the ICIC response message at step 822. However, if the specified muting ratio is considered unfeasible by the target CSG BS 112 due to higher PRB utilization, then a NACK is sent as a response to the enable ICIC mode request at step 820, with a new proposed muting ratio; and the handshake is repeated.

Optionally, the macro BS 106 can include its own PRB utilization as part of the enable ICIC mode request at step 722 so as to aid the CSG BS 112 in determining the time for which the CSG BS 112 should mute its transmissions on part of the bandwidth specified by the operating muting ratio.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:
1. A method for reducing interference in a communication network including a first node and a first node coverage area, a second closed subscriber group (CSG) node having a CSG cell, transmitting at a lower power than the first node and located within the first node coverage area, and one or more user equipment (UE) devices located within the first node coverage area, comprising:
receiving, at the second CSG node, a request for Physical Resource Block (PRB) utilization from the first node;
requesting, by the second CSG node, interference cancellation (IC) capability of the one or more UE devices;
receiving an IC capability report from the first node for the one or more UE devices;
determining if the one or more UE devices is IC capable based on the received capability report and, if any of the UE devices are not IC capable, the method further comprising:
reporting the PRB utilization to the first node;
receiving, from the first node, instructions for the second CSG node to operate in an interference cancellation (IC) mode with an (X:Y) operating ratio of a number of inactive frames (X) to a total number of frames in the CSG cell (Y), the operating ratio determined based on the reported PRB utilization; and
switching, at the second CSG node, to an IC mode that mutes, according to the operating ratio, transmission of reference signals causing interference for the UE devices.

2. The method according to claim 1, the method further comprising:
determining if the received PRB utilization request includes a reason for the request and, if the PRB utilization request does not include a reason, the method further comprising:
transmitting a NACK message to the first node, rejecting the PRB utilization request.

3. The method according to claim 1, the method further comprising:
determining if the received (X:Y) operating ratio is acceptable and, if the received (X:Y) operating ratio is not acceptable, the method further comprising:
transmitting a NACK message to the first node, rejecting the received (X:Y) operating ratio.

4. The method according to claim 3, further comprising:
transmitting a proposed new (X:Y) operating ratio to the first node; and
waiting for a response from the first node regarding the proposed new (X:Y) operating ratio.

5. The method according to claim 1, the method further comprising:
determining if the received (X:Y) operating ratio is acceptable and, if the received (X:Y) operating ratio is acceptable, the method further comprising:
operating in an interference cancellation (IC) mode with the received (X:Y) operating ratio.

6. The method according to claim 1, wherein the IC capability comprises inter-cell interference coordination.

7. A closed subscriber group (CSG) node for reducing interference in a communication network including a first node and a first node coverage area, and one or more user equipment (UE) devices located within the first node coverage area, the CSG node transmitting at a lower power than the first node and located within the first node coverage area, the CSG node having a CSG cell, the method comprising:
a processor;
a memory coupled to the processor;
a transceiver coupled to the processor; and
an antenna coupled to the transceiver configured to transmit and receive signals, wherein the processor is configured to:
receive, at the CSG node, a request for Physical Resource Block (PRB) utilization from the first node;
request, by the CSG node, interference cancellation (IC) capability of the one or more UE devices;
receive a IC capability report from the first node for the one or more UE devices;
determine if the one or more UE devices is IC capable based on the received capability report, and if any of the UE devices are not IC capable, the processor further configured to:
report the PRB utilization to the first node;
receive, from the first node, instructions for the CSG node to operate in an interference cancellation (IC) mode with an (X:Y) operating ratio of a number of inactive frames (X) to a total number of frames in the CSG cell (Y), the operating ratio determined based on the reported PRB utilization; and
switch, at the CSG node, to an IC mode that mutes, according to the operating ratio, transmission of reference signals causing interference for the UE devices.

8. The CSG node according to claim 7, wherein the processor is further configured to:
determine if the received PRB utilization request includes a reason for the request and, if the PRB utilization request does not include a reason, the processor further configured to:
transmit a NACK message to the first node, rejecting the PRB utilization request.

9. The CSG node according to claim 7, wherein the processor is further configured to:
determine if the received (X:Y) operating ratio is acceptable and, if the received (X:Y) operating ratio is not acceptable, the processor further configured to:
transmit a NACK message to the first node, rejecting the received (X:Y) operating ratio.

10. The CSG node according to claim 7, wherein the processor is further configured to:
transmit a proposed new (X:Y) operating ratio to the first node; and
wait for a response from the first node regarding the proposed new (X:Y) operating ratio.

11. The CSG node according to claim 7, where the processor is further configured to:
determine if the received (X:Y) operating ratio is acceptable and, if the received (X:Y) operating ratio is acceptable, the processor further configured to:
operate the CSG node in an interference cancellation (IC) mode with the received (X:Y) operating ratio.

12. The CSG node according to claim 7, wherein the IC capability comprises inter-cell interference coordination.

13. A method for reducing interference in a communication network including a first node and a first node coverage area, a second closed subscriber group (CSG) node, transmitting at a lower power than the first node and located within the first node coverage area, and one or more user equipment (UE) devices located within the first node coverage area, comprising:
detecting uplink (UL) interference at the second CSG node;
determining if the detected UL interference is from one or more UE devices that is not connected to the second CSG node and, if the detected UL interference is from one or more UE devices that is not connected to the second CSG node, the method further comprising:

determining if the detected UL interference is greater than a predetermined interference threshold and, if the detected UL interference is greater than a predetermined interference threshold, the method further comprising:

requesting, by the second CSG node, the interference cancellation (IC) capability of the interfering UE devices;

receiving, at the second CSG node, an IC capabilities report from the first node;

determining if the interfering UE devices are IC capable based on the received capability report and, if any of the interfering UE devices are not IC capable, the method further comprising:

switching, at the second CSG node, to an IC mode that mutes transmission of reference signals from the second CSG node.

14. The method according to claim 13, further comprising:

if any of the interfering UE devices are not IC capable, requesting Physical Resource Block (PRB) utilization information from the first node;

receiving the PRB utilization information at the second CSG node;

determining an IC operating ratio from the received PRB utilization information, the IC operating ratio being a number of inactive frames to a total number of frames in a CSG cell of the second CSG node; and switching to an IC mode at the second CSG node based on the determined operating ratio, and wherein the muting the transmission of the reference signals is based on the determined IC operating ratio.

15. The method according to claim 13, further comprising:

if any of the interfering UE devices are not IC capable, monitoring interference at the second CSG node; and, if interference is detected at the second CSG node, the method further comprising:

continuing to operate in IC mode at the second CSG mode.

16. The method according to claim 13, further comprising:

if any of the interfering UE devices are not IC capable, monitoring interference at the second CSG node; and, if interference is detected at the second CSG node, the method further comprising:

continuing to operate in IC mode at the second CSG node until a predetermined number of sub-frames have been transmitted by the second CSG node.

17. The method according to claim 13, wherein the IC capability comprises inter-cell interference coordination.

18. A closed subscriber group (CSG) node for reducing interference in a communication network including a first node and a first node coverage area, and one or more user equipment (UE) devices located within the first node coverage area, the CSG node transmitting at a lower power than the first node and located within the first node coverage area, comprising:

a processor;
a memory coupled to the processor;
a transceiver coupled to the processor; and
an antenna coupled to the transceiver configured to transmit and receive signals, wherein the processor is configured to:

detect uplink (UL) interference at the CSG node;

determine if the detected UL interference is from one or more UE devices that is not connected to the CSG node and, if the detected UL interference is from one or more UE devices that is not connected to the CSG node, the processor further configured to:

determine if the detected UL interference is greater than a predetermined interference threshold and, if the detected UL interference is greater than a predetermined interference threshold, the processor further configured to:

request, by the CSG node, the interference cancellation (IC) capability of the interfering UE devices;

receive, at the CSG node, an IC capabilities report from the first node;

determine if the interfering UE devices are IC capable based on the received capability report and, if any of the interfering UE devices are not IC capable, the processor further configured to:

switch, at the CSG node, to an IC mode that mutes transmission of reference signals from the second CSG node.

19. The CSG node according to claim 18, the processor further configured to:

if any of the interfering UE devices are not IC capable, request Physical Resource Block (PRB) utilization information from the first node;

receive the PRB utilization information at the CSG node;

determine an IC operating ratio from the received PRB utilization information, the IC operating ratio being a number of inactive frames to a total number of frames in a CSG cell of the second CSG node; and switch to an IC mode at the CSG node based on the determined operating ratio, and wherein the muting the transmission of the reference signals is based on the determined IC operating ratio.

20. The CSG node according to claim 18, the processor further configured to:

if any of the interfering UE devices are not IC capable, monitor interference at the CSG node; and, if interference is detected at the CSG node, the processor further configured to:

continue to operate in IC mode at the CSG mode.

21. The CSG node according to claim 18, the processor further configured to:

if any of the interfering UE devices are not IC capable, monitor interference at the CSG node; and, if interference is detected at the CSG node, the processor further configured to:

continue to operate in IC mode at the CSG node until a predetermined number of sub-frames have been transmitted by the CSG node.

22. The CSG node according to claim 18, wherein the IC capability comprises inter-cell interference coordination.

* * * * *